United States Patent

Kamachi et al.

[11] Patent Number: 5,167,158
[45] Date of Patent: Dec. 1, 1992

[54] SEMICONDUCTOR FILM PRESSURE SENSOR AND METHOD OF MANUFACTURING SAME

[75] Inventors: Makoto Kamachi; Jun Tajika; Aki Tabata; Noritake Suzuki; Hiroshi Inagaki, all of Kanagawa, Japan

[73] Assignee: Kabushiki Kaisha Komatsu Seisakusho, Tokyo, Japan

[21] Appl. No.: 474,759
[22] PCT Filed: May 23, 1988
[86] PCT No.: PCT/JP88/00486
§ 371 Date: Mar. 26, 1990
§ 102(e) Date: Mar. 26, 1990
[87] PCT Pub. No.: WO89/03592
PCT Pub. Date: Apr. 20, 1989

[30] Foreign Application Priority Data

| Oct. 7, 1987 | [JP] | Japan | 62-254459 |
| Oct. 7, 1987 | [JP] | Japan | 62-254461 |
| Oct. 28, 1987 | [JP] | Japan | 62-272590 |
| Mar. 15, 1988 | [JP] | Japan | 63-62496 |

[51] Int. Cl.$^5$ ............................ G01L 7/08; G01L 9/06
[52] U.S. Cl. ........................................ 73/727; 73/706; 73/708; 73/721; 338/3; 338/4
[58] Field of Search ............... 73/721, 727, DIG. 4, 73/708, 754, 706; 338/4, 2, 3; 357/26; 29/621.1; 437/26

[56] References Cited

U.S. PATENT DOCUMENTS

| 3,858,150 | 12/1974 | Gurtler et al. | 338/2 |
| 4,003,127 | 1/1977 | Jaffe et al. | 437/192 |
| 4,657,775 | 4/1987 | Shioiri et al. | 427/38 |
| 4,670,969 | 6/1987 | Yamada et al. | 357/26 |
| 4,771,639 | 9/1988 | Saigusa et al. | 73/727 |

FOREIGN PATENT DOCUMENTS

| 3345988 | 6/1984 | Fed. Rep. of Germany | 73/727 |
| 61-47532 | 7/1986 | Japan . | |
| 61-217733 | 9/1986 | Japan . | |

OTHER PUBLICATIONS

Transducers '85, International Conference on Solid-State Sensors and Actuators, pp. 430–433, NY, US–"Polysilicon layers lead to a new generation of pressure sensors".

Primary Examiner—Donald O. Woodiel
Attorney, Agent, or Firm—Diller, Ramik & Wight

[57] ABSTRACT

This invention provides a semiconductor film pressure sensor in which the pressure-sensitive resistance layers are made of an n-type polycrystalline silicon layer, and a method of manufacturing the sensor. In the semiconductor film pressure sensor of the invention, the pressure-sensitive resistance layers are formed on a diaphragm, and in addition a coarsely adjusting pattern and a finely adjusting pattern for zero point adjustment and the resistors of a temperature compensating circuit are formed on the diaphragm using the same n-type polycrystalline silicone layer. In formation of the n-type polycrystalline silicone layer, the substrate temperature is held at 500° to 600° C. The coarsely adjusting pattern and finely adjusting pattern for zero point adjustment, and the resistors of the temperature compensating circuit are formed in the same step as the pressure-sensitive resistance layers.

16 Claims, 25 Drawing Sheets

SEMICONDUCTOR FILM PRESSURE SENSOR AND METHOD OF MANUFACTURING SAME

TECHNICAL FIELD

This invention relates to a semiconductor film pressure sensor based on the piezo resistance effect of a semiconductor film pattern, and a method of manufacturing the semiconductor film pressure sensor.

BACKGROUND ART

Recently, attention has been paid to a semiconductor pressure sensor utilizing the piezo resistance effect of semiconductor such as silicon and germanium.

For instance, the inventors have proposed a film pressure sensor which is formed with an n-type microcrystalline silicon ($\mu$c-Si) formed by a plasma CVD method as a pressure-sensitive resistance layer (Japanese Patent Application No. 111377/1986).

In the film pressure sensor, not only the adhesion between the diaphragm and the gauge section, but also the adhesion between the insulating layer and the pressure-sensitive resistance layer is satisfactory; however, the pressure-sensitive resistance layer is still unsatisfactory in temperature characteristic.

In addition, a structure using a p-type polycrystal silicon as its pressure-sensitive resistance layer has been proposed ("Sensor Technique", December 1985, Vol. 5, No. 13, pp. 30–34).

In formation of a p-type polycrystalline silicon layer by the plasma CVD method, it is necessary to use high power, because if high frequency power (RF power) less than 100 W is used, then it will become amorphous. In the case also where the gas ratio is changed, it is necessary to employ high power. However, it is well known in the art that plasma uniformity is, in general, low with high power.

Accordingly, in the case where a film pressure sensor is formed with the p-type polycrystalline silicon layer as the photo-sensitive resistance layer, the photo-sensitive resistance layer is improved in temperature characteristic; however, it is not uniform in resistance. Therefore, the film pressure sensor thus formed is disadvantageous in that in formation of a bridge circuit, it is necessary to perform resistance compensation which is rather troublesome.

DISCLOSURE OF THE INVENTION

In view of the foregoing, the present invention provides a semiconductor film pressure sensor using an n-type polycrystalline silicon layer to form pressure-sensitive resistance layers (films).

That is, the inventors have found it through experiments that, in a semiconductor film pressure sensor, the use of an n-type polycrystalline silicon layer to form pressure-sensitive resistance layers is superior in manufacturing efficiency and in sensitivity characteristic to the use of a p-type polycrystalline silicon layer. The invention has been developed on this finding.

Furthermore, the inventors have performed intensive research on the n-type polycrystalline silicon layer which has been considered difficult to use as pressure-sensitive resistance layer. As a result, it has been found that pressure-sensitive resistance layers uniform and excellent in characteristic can be obtained by greatly increasing the temperature condition in the plasma CVD method which is heretofore 180° to 300° C. The present invention is developed according to this finding.

In the invention, the substrate temperature is set to 500° to 650° to form an n-type polycrystalline silicon layer which is used to provide pressure-sensitive resistance layers.

In the invention, in manufacturing a film pressure sensor, coarsely adjusting patterns and finely adjusting patterns for zero point adjustment are formed using the same material as the pressure-sensitive resistance layers. After the sensor has been formed, coarse adjustment is carried out by selectively using the coarsely adjusting patterns, and then fine adjustment is performed by selectively using the finely adjusting patterns.

Preferably those zero point adjusting patterns are L-shaped or U-shaped so as to increase the substantial line width.

According to the method using the coarsely adjusting patterns and the finely adjusting patterns, a fine adjusting pitch can be provided in a limited region, so that the resistances can be readily adjusted with high accuracy. And the adjustment can be achieved by selectively using the wire bonding positions (electrodes).

When the adjustment must be performed more precisely, then the adjusting resistance patterns may be machined with a laser for instance.

Thus, the offset voltage can be greatly reduced without use of an external circuit or the like, with the result that the sensor's characteristic is improved.

More preferably, the zero point adjusting resistance patterns are arranged coaxial with the diaphragm.

With the structure described above, the effect of the film thickness distribution can be minimized, as a result of which the small resistors of the zero point compensating resistance pattern RC are substantially equal to the average value thereof; that is, the adjustment can be made in an equal pitch mode.

Furthermore, in the invention, temperature compensating resistors for the film pressure sensor and the strain gauge are formed on one and the same substrate using the same material.

That is, the temperature compensating resistors and the strain gauge are formed in one and the same manufacturing step. For instance, when a polycrystalline silicon film is patterned to form a strain gauge, simultaneously the resistors are formed by patterning the same. And the wiring of the resistors to the sensor section is formed using the same material as the electrode wiring patterns of the sensor section.

The patterns of polycrystalline silicon film or the like forming the resistance section can be changed in resistance as required by changing the configurations thereof. Hence, without use of external resistance elements, the temperature dependability of the drop voltage of the transistor can be coincided with the rate of change in sensitivity drop of the strain gauge.

A pressure sensor device of the invention comprises: a sensor body which includes as one unit a diaphragm section with a pressure sensor arranged on the rear side of its pressure receiving surface, and a pressure introducing section for introducing a gas or liquid to be measured to the pressure receiving surface, the sensor body being so threaded as to be threadably engaged with an object under measurement.

Because of the above-described structure, the device can be greatly reduce in size, and it can be readily coupled to any object under measurement which is so threaded as to be engaged with the threads formed on the sensor body.

Furthermore, in the pressure sensor of the invention in which the strain gauge is arranged on the side of the diaphragm which is opposite to the side to which pressure is applied, the temperature compensating elements are provided on the seal cap which is provided in such a manner as to surround the diaphragm's surface where the strain gauge is formed.

In this arrangement, the sensor section and the temperature compensating elements are disposed adjacent to each other, and accordingly they are substantially equal in temperature, with the result that the temperature compensation can be achieved with high accuracy.

BEST MODE FOR CARRYING OUT THE INVENTION

Figure 1A:
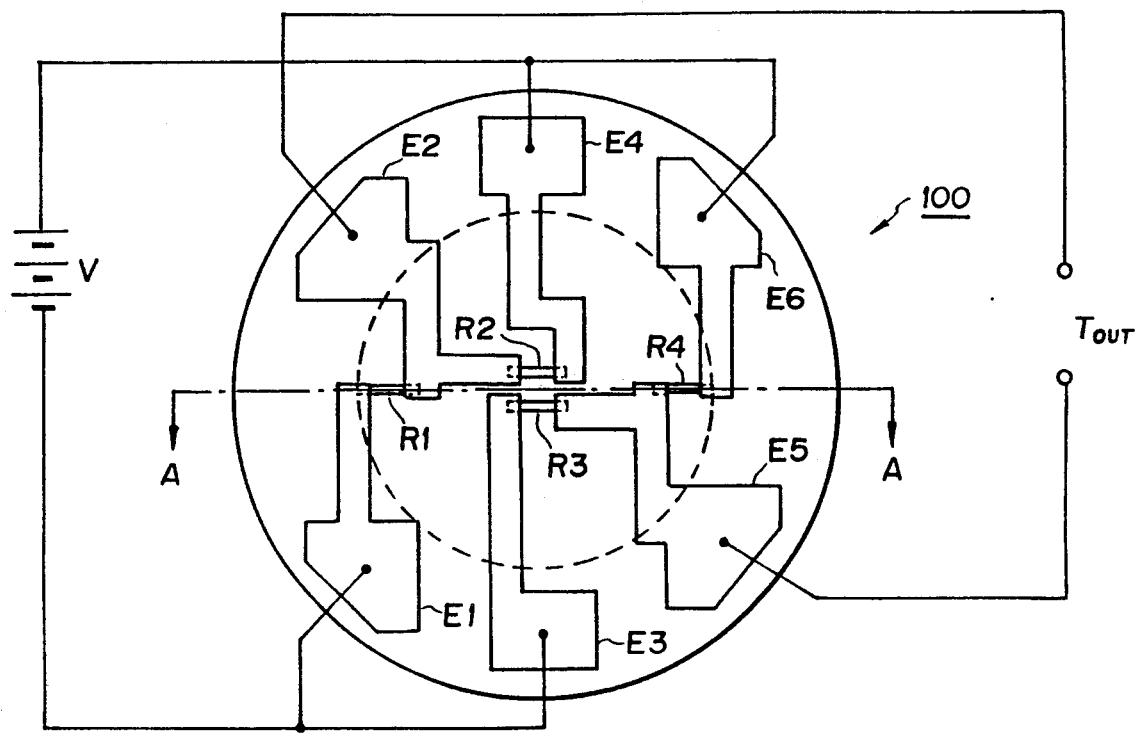
FIG. 1a is a plan view of a semiconductor film pressure sensor, one embodiment of this invention.
Figure 1B:
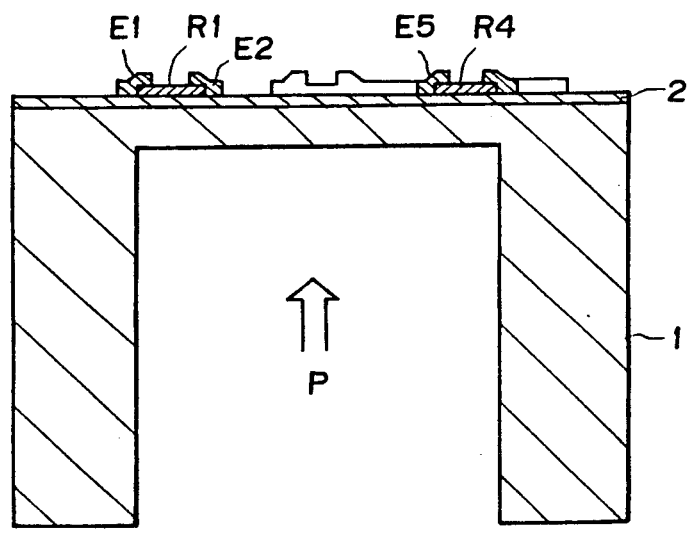
FIG. 1(b) is a sectional diagram taken along line A—A of FIG. 1(a).

FIGS. 1(a) and (b) shows a film pressure sensor, one embodiment of this invention. More specifically, FIG. 1(a) is a plan view of the sensor, and FIG. 1(b) is a sectional view taken along line A—A of FIG. 1(a). The semiconductor film sensor 100 is formed as follows: An insulating layer 2 is formed on a diaphragm 1 of stainless steel, and pressure-sensitive resistance layer patterns R1, R2, R3 and R4 which are n-type polycrystalline silicon layers, and electrode wiring patterns E1, E2, E3, E4, E5 and E6 which are aluminum layers are formed on the insulating layer 2.

A passivation film is formed on the pressure-sensitive resistance layer patterns R1 through R4 and the electrode wiring patterns E1 through E6 to protect them. However, for convenience in illustration, the passivation film is not shown in FIGS. 1(a) and (b).

A method of manufacturing the semiconductor film pressure sensor thus constructed will be described.

Figure 2A:
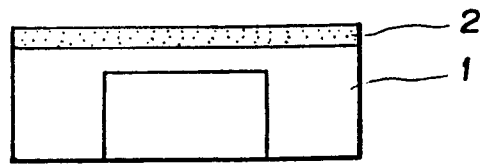
FIGS. 2(a)–(e) are diagrams showing steps of manufacturing the semiconductor film pressure sensor shown in FIG. 1.

The insulating film 2 of a silicon oxide layer is formed on the surface of the diaphragm of stainless steel to about 10 μm by the plasma CVD method (FIG. 2(a)).

Figure 2B:
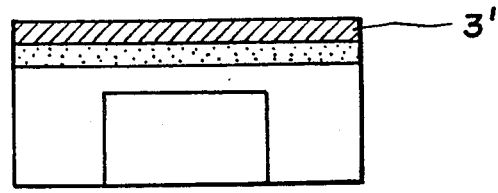

An n-type polycrystalline silicon layer 3' is formed on the insulating film 2 to about 1 μm by the plasma CVD method in order to form the pressure-sensitive resistance layer patterns R1 through R4 (FIG. 2(b)), under the following conditions: The substrate temperature is 540°, the gas pressure is 1.0 Torr, the reaction gas is silane (SiH$_4$)+hydrogen H$_2$)+phosphine (PH$_3$) with SiH$_4$/H$_2$=1/30 and SiH$_4$/PH$_3$=1.0%, and RF power is 50 W.

Figure 2C:
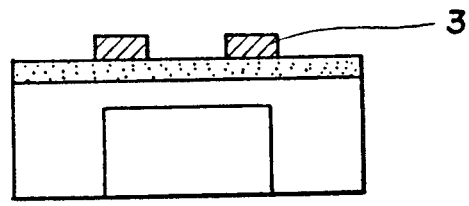

Thereafter, patterning is carried out according to the ordinary photolithography to form photo-sensitive resistance layers 3 (corresponding to the pressure sensitive resistance layer patterns R1 through R4) as strain gauge (FIG. 2(c).

Figure 2D:
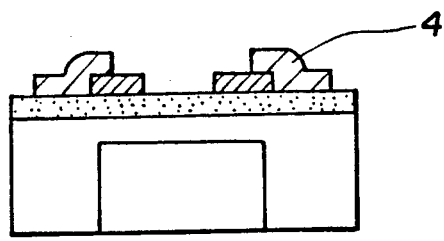

Next, an aluminum layer is formed by an electron beam (EB) vacuum deposition method to form the electrode wiring patterns E1 through E6, and is subjected to patterning by a metal mask method or photolithography, to form electrode wiring patterns 4 (corresponding to the electrode wiring patterns E1 through E6) FIG. 2(d).

Figure 2E:
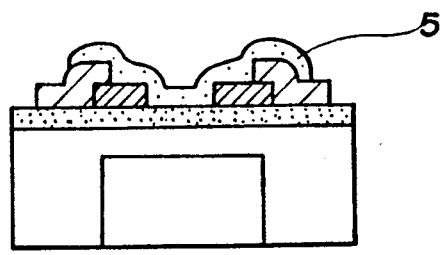

Under this condition, the final step is carried out; that is, a silicon nitride layer 5 is formed as the passivation film by the plasma CVD method to cover the surface of the sensor (FIG. 2(e).

In the semiconductor film pressure sensor 100 thus formed, the electrode wiring patterns E2 and E5 are connected to output terminals Tout, the electrode wiring patterns E1 and E3 are connected to each other by wire bonding and to the negative terminal of an electric source V, and the electrode wiring patterns E4 and E6 are connected to each other by wire bonding and to the positive terminal of the electric source V.

Figure 3:
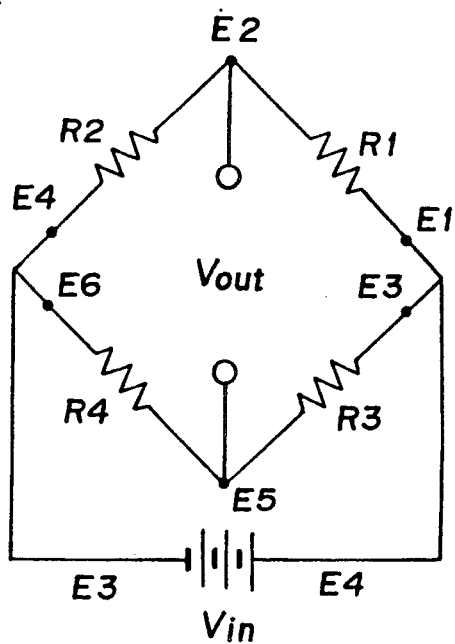
FIG. 3 is an equivalent circuit of the semiconductor film pressure sensor shown in FIGS. 1(a) and (b).

The pressure-sensitive resistance layer patterns R1, R2, R3 and R4 form a bridge circuit, whose equivalent circuit is as shown in FIG. 3.

Under no load (no pressure being applied), the resistances of the pressure-sensitive resistance layer patterns R1 through R4 are equal to one another; that is, the resistances are R.

Figure 4:
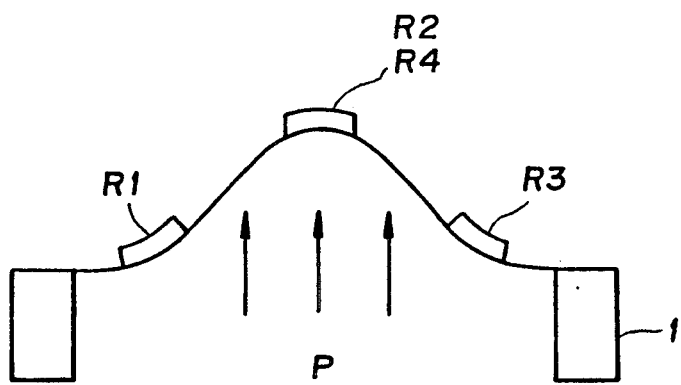
FIG. 4 is an explanatory diagram for a description of the operating principle of the semiconductor film pressure sensor shown in FIGS. 1(a) and (b).

It is assumed that a pressure P is applied to the diaphragm 1 as shown in FIG. 4. The pressure-sensitive resistance layer patterns R1 and R4 are located in the peripheral region of the diaphragm 1, and the other pressure-sensitive resistance layer patterns R2 and R3 are located in the central region of the diaphragm 1. Therefore, in this case, the pressure-sensitive resistance layer patterns R1 and R3 are subjected to compression stress, so that their resistances are changed to R+$\Delta$R, whereas the pressure-sensitive resistance layer patterns R2 and R4 are subjected to tensile stress, so that their resistances are changed to R−$\Delta$R.

It is assumed that a voltage Vin is applied across the connecting points of the electrode wiring patterns E1 and E3, and E2 and E6 by the electric source V. Under no load, the four pressure-sensitive resistance layer patterns R1 through R4 are equal in resistance to one another, and therefore the potentials at the electrodes wiring patterns E2 and E5 are equal to each other, and therefore the voltage Vout across the output terminals Tout is zero (Vout=0).

Therefore, when a pressure P is applied to the diaphragm as shown in FIG. 4, so that the resistances of the pressure-sensitive resistance layer patterns R1 and R3 are changed to R+$\Delta$R, and the resistances of the pressure-sensitive resistance layer patterns R2 and R4 are changed to R−$\Delta$R, then the output voltage Vout is as follows:

$$Vout = 2(\Delta R/R)Vin$$

As was described above, when a pressure P is applied to the diaphragm, a voltage corresponding to the pressure P is provided across the output terminals Tout. This voltage is, for instance, amplified by an amplifier means (not shown), so as to be applied to an external circuit.

Figure 5:
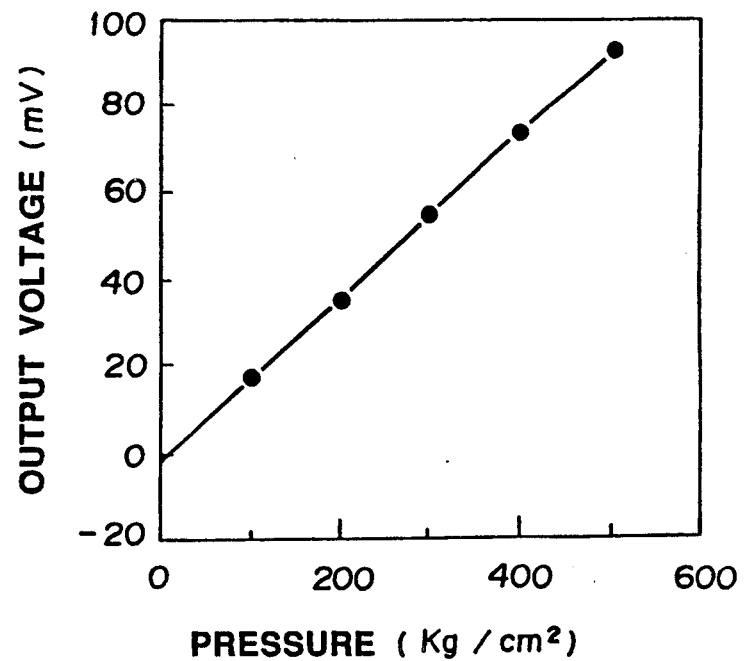
FIG. 5 is a graphical representation indicating a pressure-output voltage characteristic of the semiconductor film pressure sensor shown in FIGS. 1(a) and (b).

FIG. 5 shows the pressure—output voltage characteristic of the film pressure sensor. As shown in FIG. 5, in this case the offset voltage is extremely low, 2 mV, and therefore it is unnecessary to perform offset voltage compensation. Even with nonlinearity of the characteristic curve, and deterioration due to repetitive use taken into account, the error is in a range of 0.55% full span.

Figure 6:
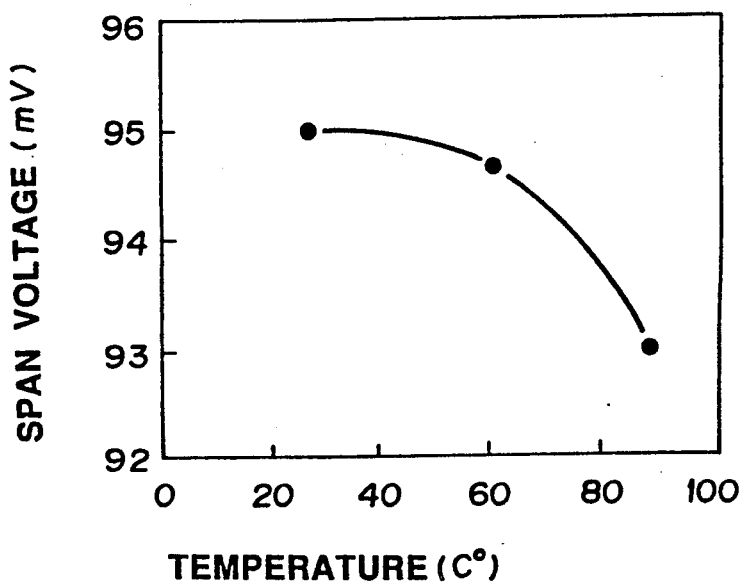
FIG. 6 is a graphical representation indicating a span voltage—temperature characteristic of the semiconductor film pressure sensor shown in FIGS. 1(a) and (b).

FIG. 6 shows the span voltage—temperature characteristic of the film pressure sensor. As is apparent from FIG. 6, the error is extremely small, 0.041% FS/°. Thus, the film pressure sensor is satisfactory in characteristic.

Figure 7:
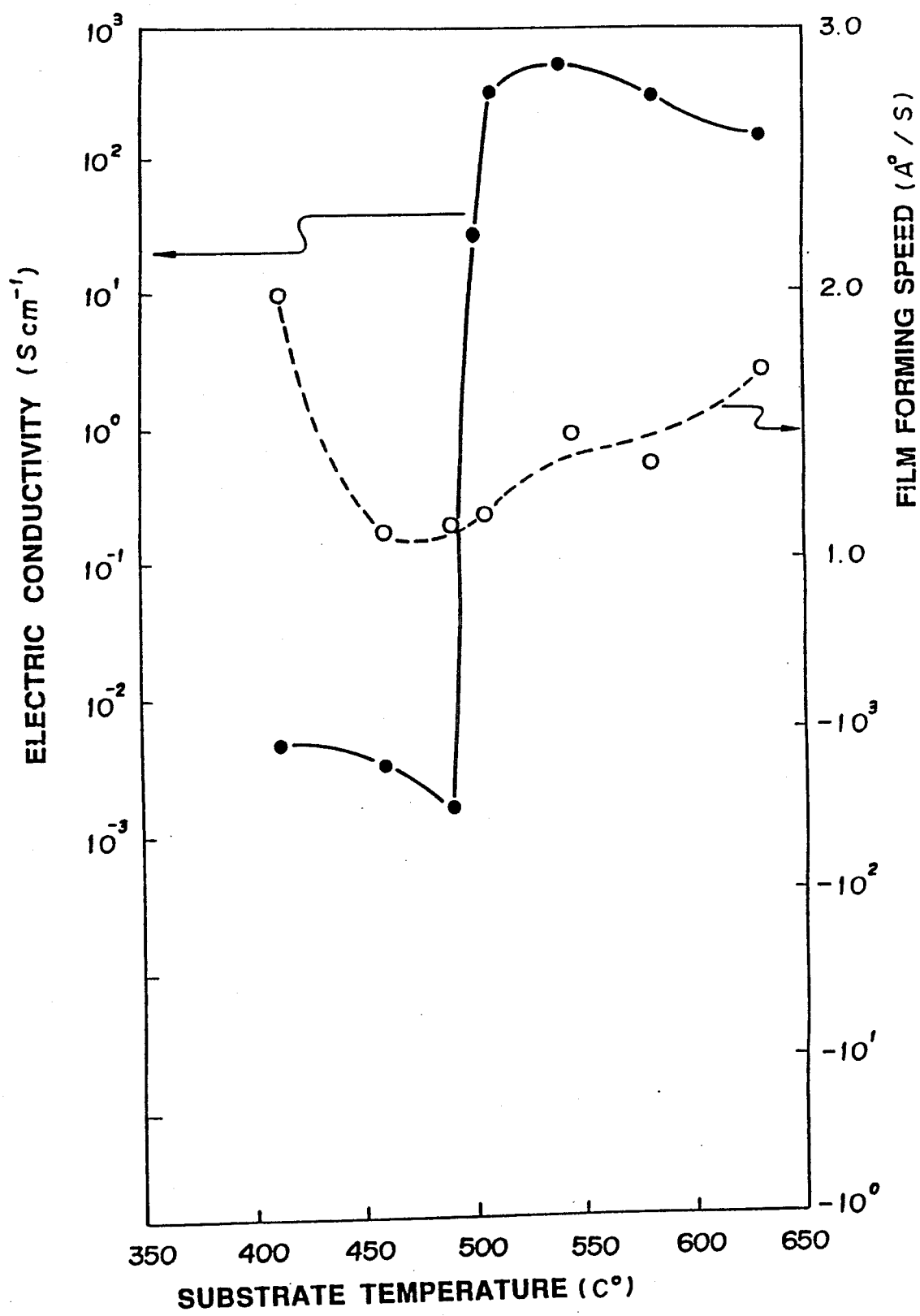
FIG. 7 is a graphical representation indicating the relationships between film forming temperature, electrical conductivity and film forming rate of an n-type polycrystalline silicon layer.

FIG. 7 shows the electrical conductivity—temperature characteristic, and the film forming rate—temperature characteristic provided in the case where n-type polycrystalline silicon layers are formed to provide pressure-sensitive resistance layer patterns under the same conditions except the substrate temperature being changed. As is apparent from FIG. 7, when the substrate temperature is higher than 500°, the electrical conductivity is greatly increased, and therefore the layer thus formed is considerably suitable as strain gauge. When it is higher than 650°, difficulties such as for instance deterioration of the insulating layer is caused.

Figure 8A:
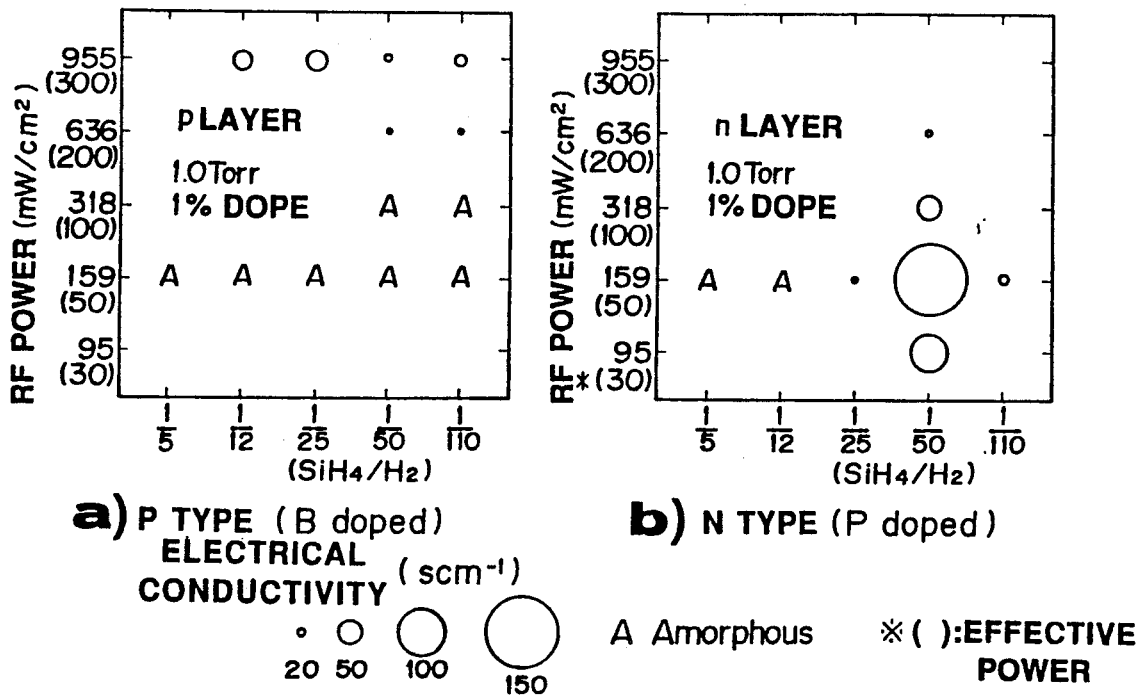
FIG. 8(a) and FIG. 8(b) are diagrams indicating the dependability of the electrical conductivity of an n-type polycrystalline silicon film on gas ration $SiH_4/H_2$ and RF power (vertical axis), and the dependability of the plasma uniformity of an n-type polycrystalline silicon film on gas ratio $SiH_4/H_2$ and RF power (vertical axis), respectively.
Figure 30:
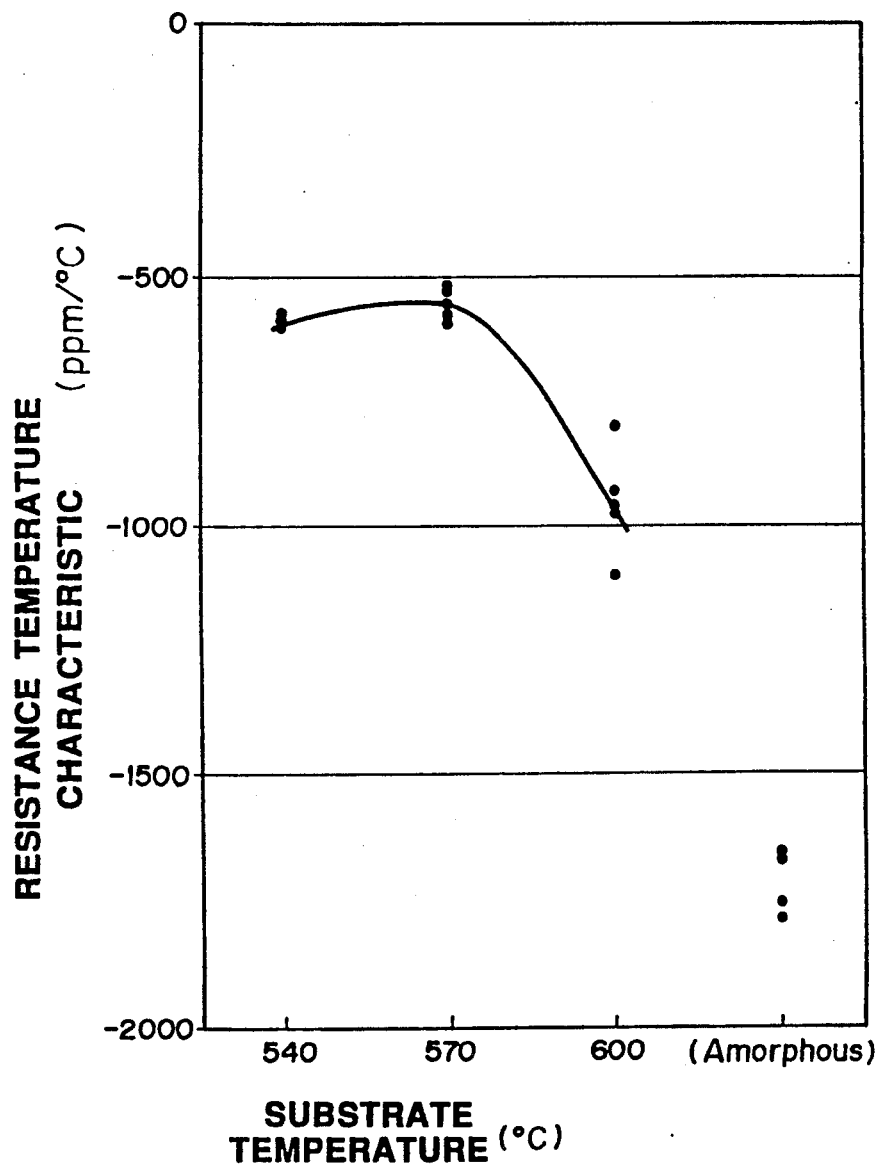
FIG. 30 is a graphical representation indicating resistance temperature characteristics with substrate temperatures of a polycrystalline silicon and amorphous silicon.

FIG. 8(a) indicates the dependability of the electrical conductivity of an n-type polycrystalline silicon film formed by the plasma CVD method on RF power and gas ratio in comparison with the dependability of the electrical conductivity of a p-type polycrystalline silicon film formed by the plasma CVD method on RF power and gas ratio. As is apparent from FIG. 8(a), in the case of p-type polycrystalline silicon film, it is amorphous when the RF power is less than 100 W (318 mW/cm$^2$), and therefore it is necessary to use power higher than 100 W for polycrystallization. In the amorphous condition, as shown in FIG. 30, the resistance temperature characteristic is large, and even if the film forming condition is changed, reduction of the resistance temperature characteristic is limited because of the low crystalline characteristic. For instance, in the amorphous condition, reduction of the resistance temperature characteristic is limited at about −1700 ppm/°C.; whereas in the polycrystalline condition, it is at about −550 ppm/°C.

In the case of the p-type, it is necessary to use high power higher than 100 W for polycrystallization. The same thing can be said even when the gas ratio (SiH$_4$/H$_2$) is changed. In the case of the p-type, even if polycrystallized, the electrical conductivity will be not more than two digits ($^1$).

On the other hand, in the case of the n-type, it will be polycrystallized by suitably determining the gas ration (SiH$_4$/H$_2$) even if the RF power is less than 100 W (318 mW/cm$^2$). For instance, in the case of the p-type, it will be polycrystallized by setting the gas ration (SiH$_4$/H$_2$) to less than 12/25 even if the RF power is less than 100 W (318 mW/cm$^2$). In the case of the n-type, an electrical conductivity of three digits (10$^2$) can be obtained. This means that the n-type is larger in carrier mobility.

In order to obtain a film high in sensitivity for a pressure sensor strain gauge, it is essential that the crystalline characteristic is excellent. In order to reduce the temperature characteristic, the film should be small in defect density and small in crystal grain size. Since the crystalline characteristic affects the electrical conductivity, not only in the case of the p-type but also in the case of the n-type, it is necessary to carry out the film formation under the condition that the electrical conductivity becomes of the order of $10^1$ to $10^2$.

Figure 8B:
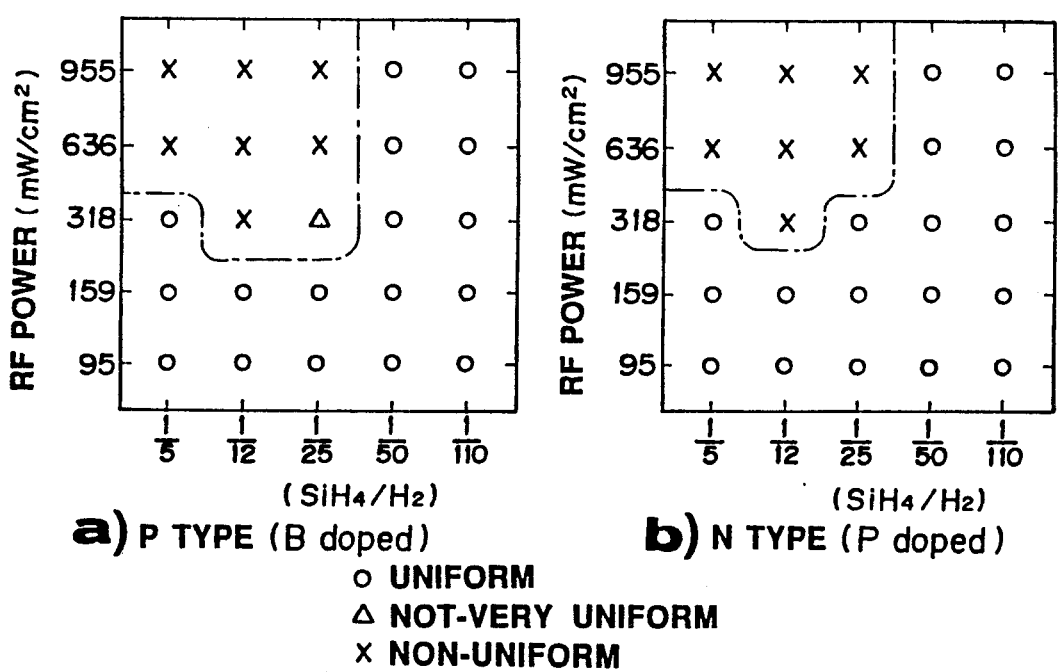

FIG. 8(b) indicates the state of plasma observed on the susceptor in formation of films under various conditions. As is seen from FIG. 8(b), not only in the case of the p-type but also in the case of the n-type, the plasma is extremely low in uniformity and unstable in the region in which the gas ratio is 1/25 to 1/4 and the RF power is high.

As is apparent from a comparison of FIG. 8(a) and (b), in the case of the p-type, the condition that a desired film is obtained for a strain gauge resides in the region where the RF power is high and the plasma is low in uniformity; whereas in the case of the n-type, the condition resides in the region where the RF power is low, and the plasma is high in uniformity.

Figure 31:
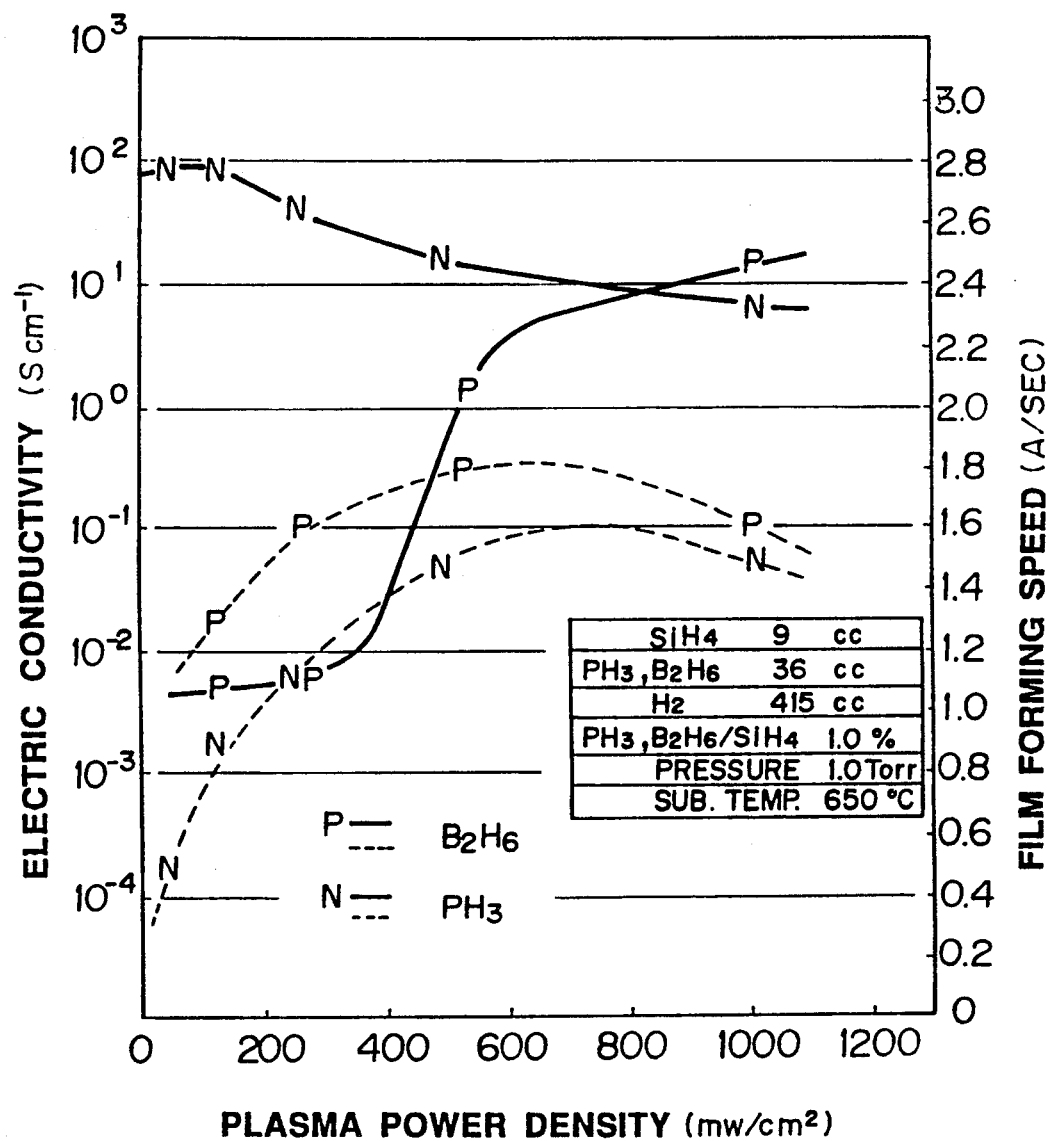
FIG. 31 is a graphical representation indicating the dependability of plasma power density on electrical conductivity and film forming rate.

FIG. 31 shows the dependability of the electrical conductivity and film forming rate of each of the p-type and n-type silicon films. As is apparent from FIG. 31, if the plasma uniformity is excellent, the samples in a batch are less in characteristic fluctuation, and therefore the manufacturing yield is improved as much. In addition, the batches are improved in reproducibility, and the resultant products are improved in reliability. In a sample, the distribution of electrical conductivity depends only on the film thickness attributing to the configuration of the product, and all the sample have the same tendency. Therefore, a circuit compensation can be made using the same material.

Figure 32:
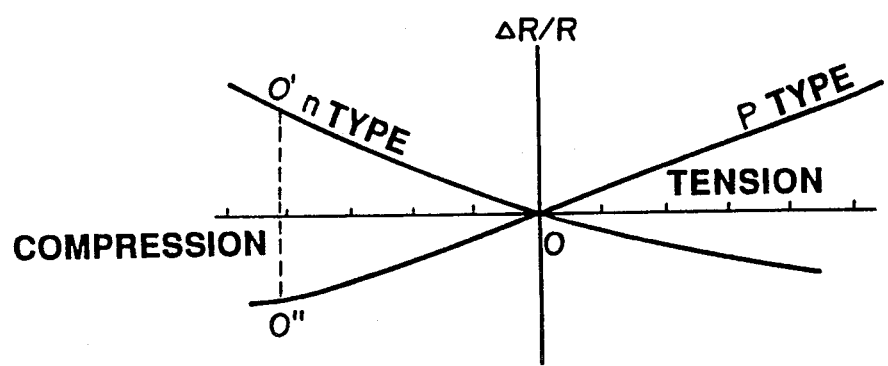
FIG. 32 is a graphical representation indicating strain temperature characteristics of an n-type silicon semiconductor and a p-type silicon semiconductor.

In the case where the diaphragm is of metal such as SUS, the metal is different from silicon Si in thermal expansion coefficient (for instance $SUS=11\times10^{-60}C^{-1}$: $Si=3.4\times10^{-60}C^{-1}$), and therefore when, after the film has formed, its temperature becomes room temperature, compression stress is applied to the film. As is shown in FIG. 32 amended, in the case of the p-type, the resistance variation due to strain of the semiconductor gauge occurs in the negative direction (resistance decrease) when compressed and in the positive direction (resistance increase) when tensioned. On the other hand, in the case of the n-type, it is in the positive direction (resistance increase) when compressed, and in the negative direction (resistance decrease) when tensioned. As was described above, compression stress is applied to the silicon film at room temperature, and therefore the operating point is moved in the compression direction as indicated by O' and O''. That is, in the case of the n-type, the gradient $\Delta R/R$ increases when compared with that in the case where the origin O is the operating point; and in the case of the p-type, it decreases when compared with that in the same case. Hence, the n-type is higher in sensitivity than the p-type.

Thus, the n-type polycrystalline silicon film is superior at least in manufacturing efficiency and in sensitivity characteristic to the p-type silicon film.

The film forming conditions for the pressure-sensitive resistance layer (film) are not limited to those in the above-described embodiment. That is, they may be suitably selected from the following ranges: $SiH_4/(H_2+PH_3)=1/20$ to 1/80, $SiH/PH_3=0.2$ to 3.0, gas pressure=0.3 to 2.0 Torr, and RF power=30 to 150 W.

The most suitable conditions of an n-type semiconductor film for a piezo resistance element are that the electrical conductivity is high, and the resistance is low in temperature characteristic. In the embodiment, in formation of the film by the plasma CVD method, a preferable substrate temperature is ranged from 500° C. to 600° C. In the case of FIG. 30, the most suitable substrate temperature is around 570° C.

In the above-described embodiment, phosphine ($PH_3$ is employed as dopant; however, the invention is not limited thereto or thereby. That is, dopants forming n-type layers may be employed.

In addition, the structure other than the pressure-sensitive resistance layers is not always limited to that which has been described above. That is, it may be changed or modified suitably.

In the above-described embodiment, the pressure-sensitive resistance layer patterns must be equal in resistance to one another. However, sometimes the resistances are slightly fluctuated during manufacture. Such a sensor is given a zero point adjustment to increase the detection accuracy. In this case, the zero point adjustment may be achieved by connecting external resistors. However, the method of using external resistors is disadvantageous in the following point: In the case where the pressure-sensitive resistance layer patterns R1 through R4 are different in temperature coefficient from the external resistors, it is necessary to use temperature compensating resistors additionally, and therefore the resultant device is inevitably intricate and bulky.

Figure 9A:
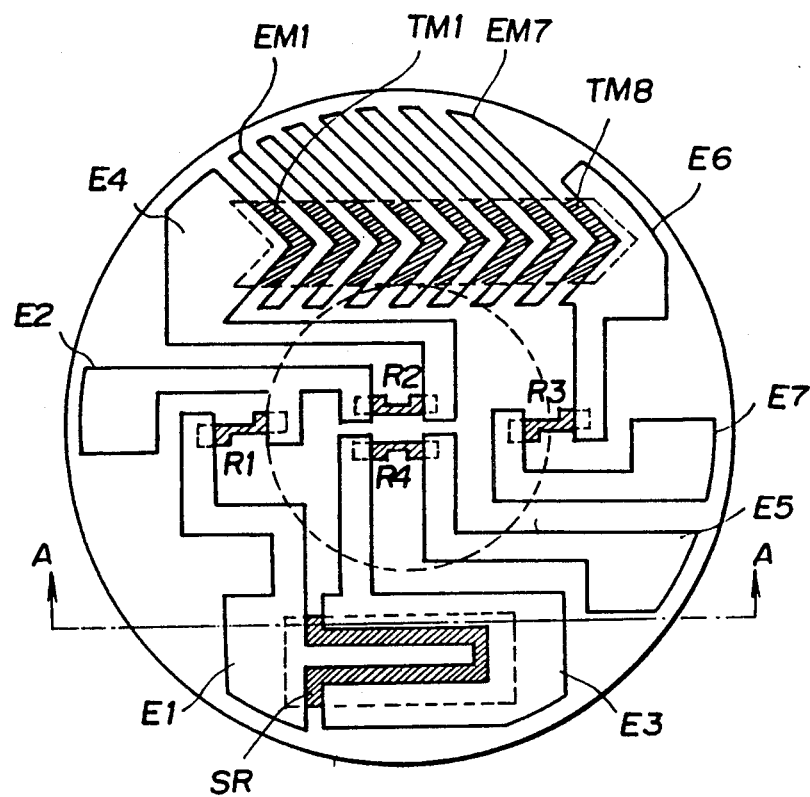
FIG. 9(a) is a plan view showing a semiconductor film pressure sensor, a second embodiment of the invention.
Figure 9B:
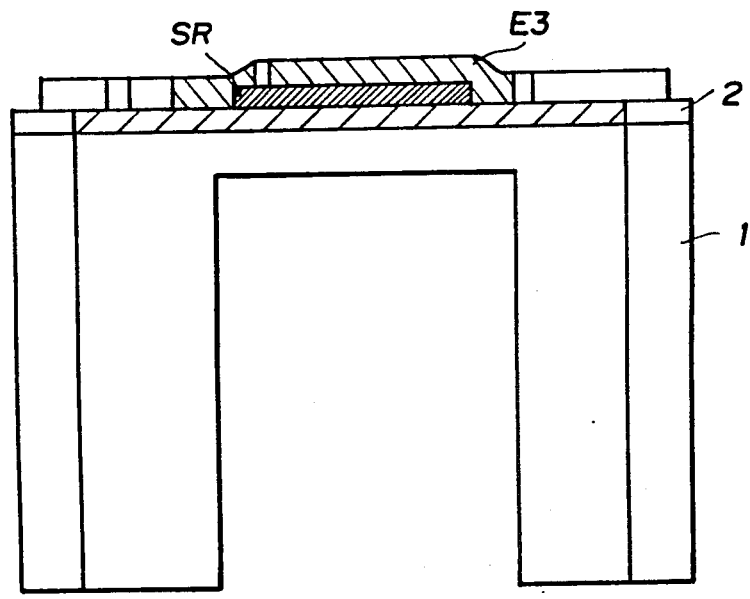
FIG. 9(b) is a sectional view taken along line A—A of FIG. 9(a).

FIG. 9(a) and (b) shows another embodiment of the invention which has eliminated the above-described difficulty.

As shown in FIG. 9(a) and (b), an insulating layer 2 is formed on a diaphragm 1 of stainless steel; pressure-sensitive resistance layer patterns R1 through R4 of silicon oxide layers, and electrode wiring patterns E1 through E7 of aluminum layers are formed on the insulating later 2; L-shaped adjusting electrode patterns EM1 through EM7 are formed between the electrode wiring patterns E4 and E6 by using the same material as the electrode wiring patterns E1 through E7; L-shaped coarsely adjusting (resistance) patterns TM1 through TM8 are formed between the adjusting electrode by using the same material as the pressure-sensitive resistance layer patterns R1 through R4; and a finely adjusting (resistance) pattern SR is formed between the electrode wiring patterns E1 and E3. The electrode wiring pattern E7 is a bridge releasing electrode, and it is connected to the electrode wiring pattern E5 after measurement of the resistances of all the patterns.

These coarsely adjusting resistance patterns TM1 through TM8, and the finely adjusting resistance pattern SR are formed simultaneously when the pressure-sensitive resistance layer patterns R1 through R4. The adjusting electrode patterns TM1 through TM8 are formed in the same manufacturing step as the electrode wiring patterns E1 through E7.

Figure 12:
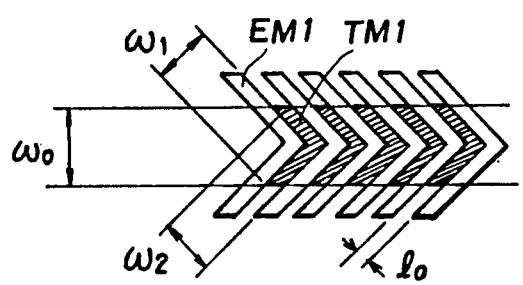
FIG. 12 is an enlarged view showing essential components of the semiconductor film pressure sensor shown in FIGS. 9(a) and (b).

As shown enlarged in FIG. 12, the coarsely adjusting resistance patterns TM1 through TM8 are arranged between the adjusting electrode patterns EM1 through EM7, and the effective length of each pattern; i.e., the length of the L-shaped pattern is $(w_1+w_2)$, and the length corresponds to the gap $l_0$ between the adjusting electrode patterns.

Figure 13:
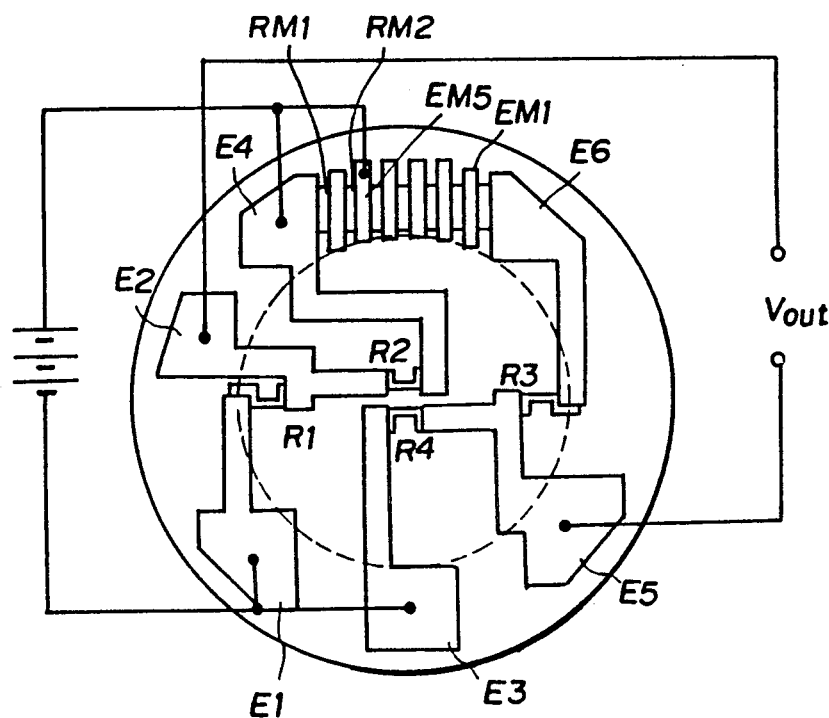
FIG. 13 is a plan view of a semiconductor film pressure sensor, a third embodiment of the invention.
Figure 14:
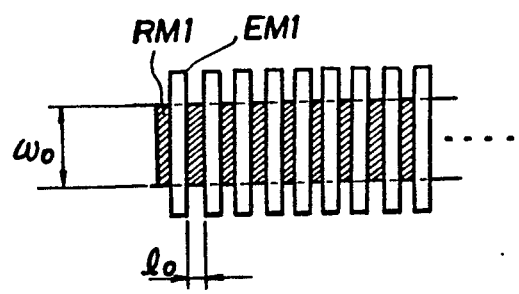
FIG. 14 is an enlarged view showing essential components of the semiconductor film pressure sensor shown in FIG. 13.

The device thus constructed is compared with the device which is arranged as shown in FIG. 13 and has linear adjusting resistance patterns as shown in FIG. 14 to find the following fact: In the case where the pattern widths are different $((W_1+w_2)>w_0$ and the pattern lengths are equal ($l_0 = l_0$), the resistance per pattern is ($w_0/(w_1+w_2)$) times, so that the adjusting pitch can be reduced. In this connection, it is assumed that the pattern width of the pressure-sensitive resistance layer pattern (gauge) is represented by a, the pattern length by b, and the resistance per unitary area by R. Then, in the device shown in FIGS. 13 and 14, the resistance of the adjusting resistance pattern is $R \times (a/b \, w_0)$, while in the case of the above-described coarsely adjusting patterns, the resistance is reduced to $R \times (a \, l_0/b(w_1+w_2))$.

The finely adjusting resistance pattern SR is interposed between the two electrode wiring patterns which are formed like combs whose teeth are intertwined with each other. Therefore, the pattern width is larger, and the resistance is extremely low. If the teeth are made thinner; i.e., if the number of teeth is increased, thereby to substantially increase the pattern width, then the resistance is further decreased.

The film pressure sensor with the coarsely adjusting patterns and the finely adjusting pattern is manufactured. And the resistances of the four pressure-sensitive resistance layer patterns (gauge) R1 through R4, the coarsely adjusting resistance patterns (between E4 and E6) and the finely adjusting resistance pattern are measured.

According to the resistances of the patterns R1 through R4, a compensating resistance value necessary for zeroing the offset value is calculated, and an adjusting electrode is selected in conformance to the compensating resistance value thus calculated, and it is determined whether or not the finely adjusting resistance pattern is used.

Figure 10:
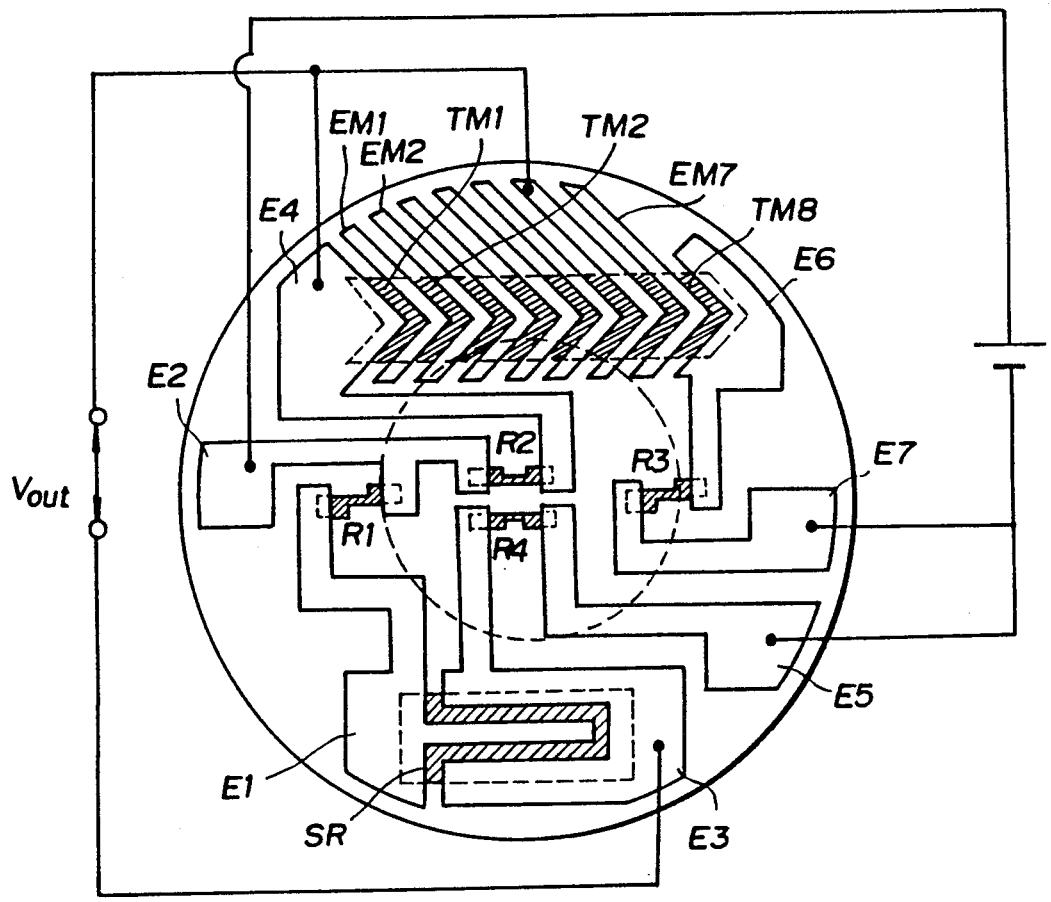
FIG. 10 is a diagram showing one example of the wiring of the semiconductor film pressure sensor shown in FIGS. 9(a) and (b).

FIG. 10 shows one example of the wiring of the above-described embodiment. In this case, the compensation is achieved by adding two coarsely adjusting resistance patterns (TM) to the pattern R3 and the finely adjusting resistance pattern to the pattern R1 by wire bonding.

Figure 11:
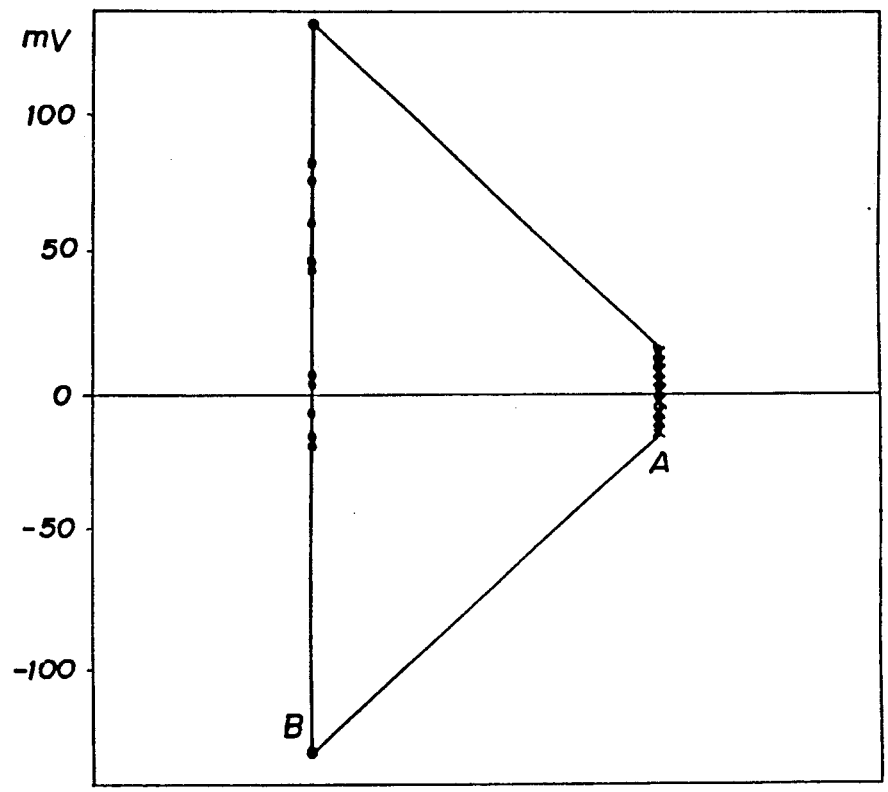
FIG. 11 is a diagram for a description of the operation of the semiconductor film pressure sensor shown in FIGS. 9(a) and (b).

FIG. 11 is a diagram showing the comparison of the offset voltage A of the film pressure sensor thus formed with the offset voltage B of the same film pressure sensor which is not compensated yet. As is apparent from FIG. 11, with the embodiment, the offset voltage is greatly reduced.

As was described above, in the embodiment, the adjustment is carried out in two steps by using the coarsely adjusting patterns and the finely adjusting pattern. Therefore, the zero point adjustment can be readily achieved with high accuracy.

In the embodiment, the coarsely adjusting resistance patterns are L-shaped; however, the invention is not limited thereto or thereby. For instance, they may be straight, or they may be bent in a zigzag consisting of a plurality of L-shaped lines. That is, in this case, the coarsely adjusting resistance patterns may be bent in any configuration which will increase the total length (or the pattern width in practice) in a limited area.

In the above-described embodiment, the electrodes are connected by wire bonding, and lead wires are connected directly to the electrodes by soldering. However, the following method may be employed: a terminal board with pads for connecting lead wires is bonded to the diaphragm, and selected wire electrodes are connected to selected pads by wire bonding. The terminal board may be positioned outside of the diaphragm.

In the film pressure sensor thus constructed, the pressure-sensitive resistance layer patterns and the compensating resistors are formed on one and the same diaphragm surface simultaneously, which eliminates the necessity of providing temperature compensating resistors. Furthermore, the zero point adjusting resistors can be formed, without increasing the number of manufacturing step, merely by slightly modifying the photomasks used in the pressure-sensitive layer and electrode patterning operations. The adjustment itself can be achieved merely by selecting the necessary wire bonding points (electrodes); that is, the correction can be achieved with ease.

In the film pressure sensor thus constructed, the small resistors of the zero point compensating resistance patterns (RM) are fluctuated in resistance because of the fluctuation of the film thickness thereof, and therefore the compensation cannot be made to desired accuracy.

Figure 16:
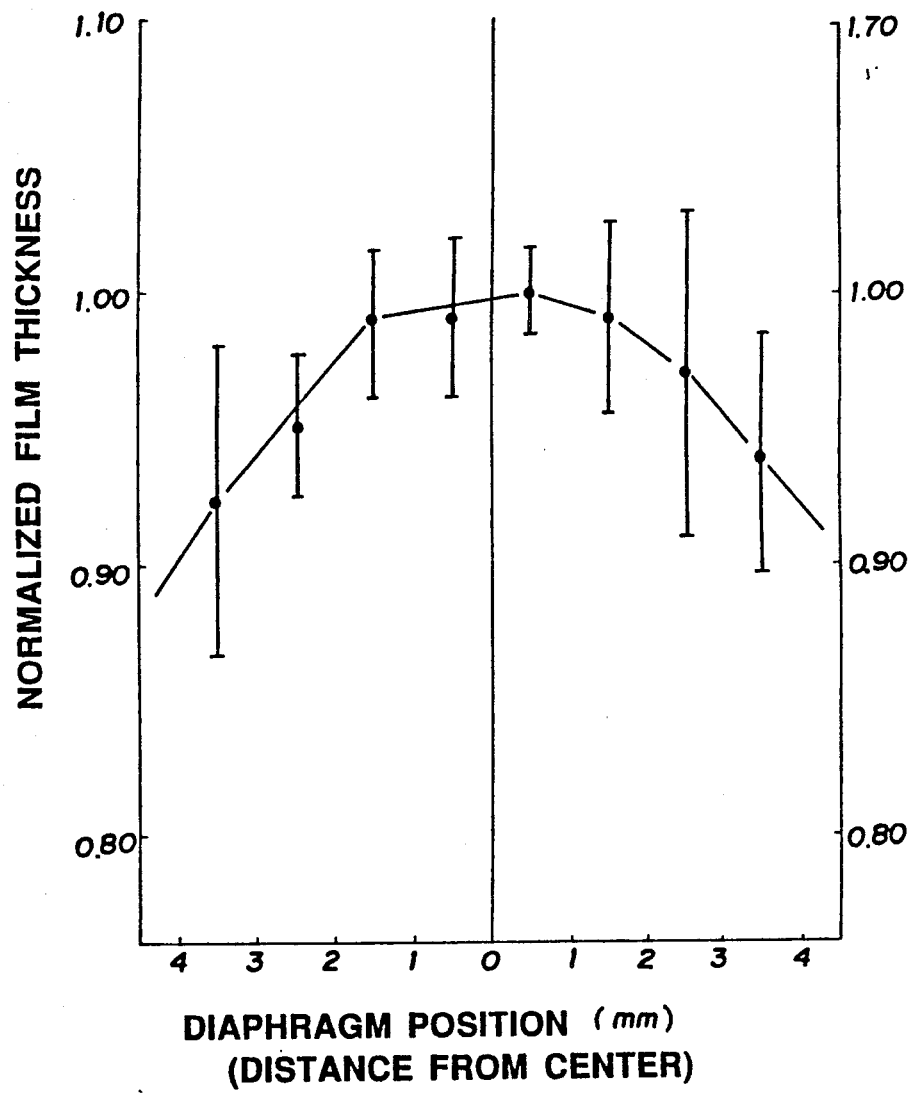
FIG. 16 is a graphical representation for a description of the operation of the fourth embodiment.

That is, in the case where the number of resistors to be used for compensation is calculated from the average value thereof, often the output voltage is greatly deviated from the calculated value after wiring, and the zero point adjustment cannot be made as required. Through research on the cause for this, the following fact has been found: Through the measurement of the relation between the position (distance from the center) on the diaphragm and the normalized value of the film thickness (the maximum value being one (1)), it has been found that, as shown in FIG. 16, the pressure-sensitive resistance layer is so distributed on the diaphragm that its thickness is decreased radially outwardly of the center. Therefore, when an elongated pattern is arranged over a wide range, then the outer resistor is larger in thickness by about 10% than the inner resistor. Accordingly, the resistance thereof differs greatly from the average value. As was described above, the number of resistors to be used for compensation is calculated from the average value, and therefore it is greatly different from the desired value, so that the compensation is inadequate or excessive when made. Thus, in order to perform the zero point compensation with high accuracy, it is essential to minimize the fluctuation in resistance of the small resistors.

Figure 15:
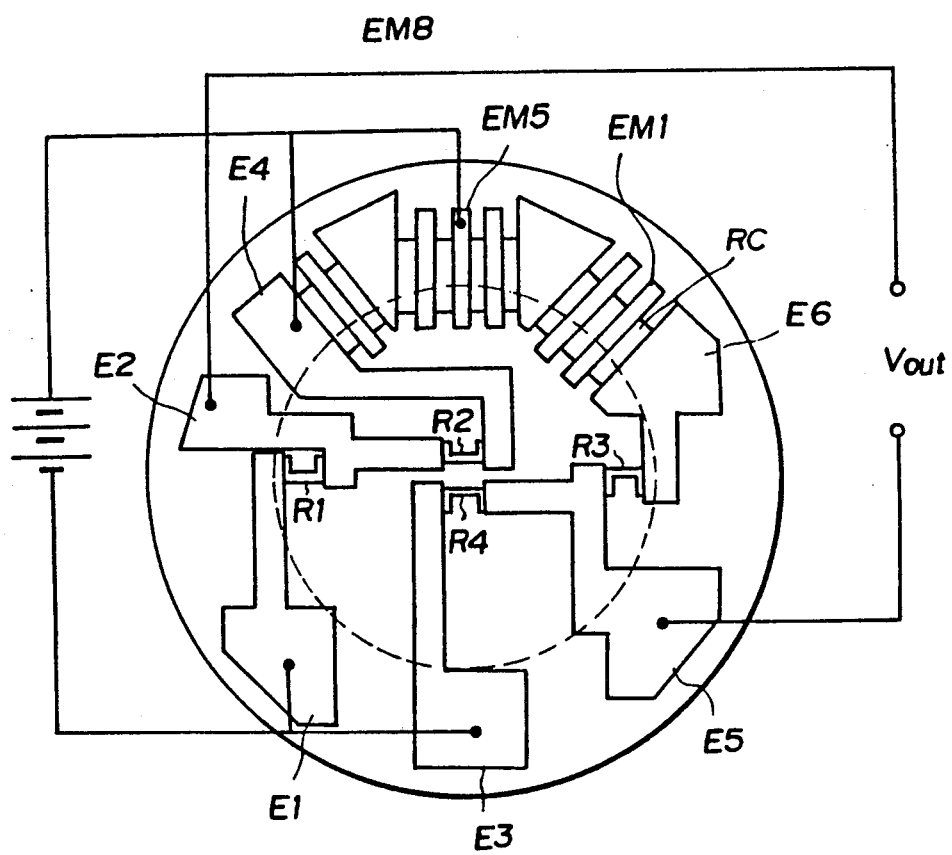
FIG. 15 is a plan view of a semiconductor film pressure sensor, a fourth embodiment of the invention.

FIG. 15 shows another embodiment of the invention which has been provided with the above-described points taken into account. The film pressure sensor is formed as follows: An insulating layer 2 of silicon oxide film ($SiO_2$) is formed on a diaphragm of stainless steel. Four pressure sensitive resistance patterns R1 through R4 of n-type polycrystalline silicon 3, and a zero point compensating resistance pattern RC of n-type polycrystalline silicon 3 which is so bent that it is substantially coaxially arranged are formed on the insulating layer 2. In addition, electrode wiring patterns 4 of aluminum layers are also formed on the insulating layer 2.

More specifically, the film pressure sensor is manufactured according to the following method: A silicon oxide ($SiO_2$) film is formed, as the insulating layer 2, on the diaphragm 1 of stainless steel to 5 to 10 μm by the CVD method.

Thereafter, an n-type polycrystalline silicon layer 3a is formed, as the pressure-sensitive resistor layers, on the silicon oxide film 2 to about 0.7 μm by the plasma CVD method.

The n-type polycrystalline silicon layer 3a is subjected to patterning by photolithography. In this operation, the patterning is made not only for the four strain gauge patterns R1 through R4 forming the sensor section, but also for the zero point compensating resistance patterns RC which is so bent as to be substantially coaxially arranged.

Next, an aluminum (Al) layer is formed, as the electrode wiring patterns 4 for energizing the strain gauge to measure voltage, by an electron beam vacuum deposition method for instance. In this operation, the electrodes EM1 through EM8 on the zero point compensating resistance pattern RC are arranged at equal intervals and are extended in a plurality of direction, so that they divide the zero point compensating resistance pattern RC into nine small resistors.

Thereafter, a silicon nitride (SiN) film or the like is formed, as a protective film, with the electrodes partially exposed for wiring. Thus, the film pressure sensor has been manufactured. Then, the resistances of the strain gauge patterns R1 through R4 are measured, and are then made as equal to one another as possible by selecting the number of small resistors; and the electrodes are connected by wire bonding as required. In the embodiment, the strain gauge pattern R3 has five small resistors by connecting the electrode E4 to the small resistor EM5.

As a result, the small resistors are made uniform in resistance, and therefore the zero point compensation can be achieved with high accuracy.

In the embodiment, the zero point compensating resistance pattern is arranged coaxial with the diaphragm, and therefore the zero point compensating resistance pattern section can be formed as a substantially uniform film. Accordingly, the small resistors are uniform in resistance, as a result of which the zero point compensation can be achieved with high accuracy. In addition, for the same reason, the film pressure sensor can be manufactured with high efficiency.

A semiconductor element is disadvantageous in that its characteristic depends greatly on temperature. However, it is excellent in the reproducibility of the element characteristic with respect to temperature change; that is, when temperature changes repeated, the characteristic change is repeated with high reproducibility. Therefore, after compensated, the semiconductor element is made high in reliability by the reproducibility. When a semiconductor film pressure sensor is subjected to temperature change, because of the resistance inherent in the strain gauge and the change in resistance by pressure the resistance of the strain gauge changes with temperature. Accordingly, in a bridge circuit with a strain gauge, the pressure sensitivity and zero point change with temperature. That is, the accuracy of the pressure sensor depends on how accurately the temperature compensation is carried out. Accordingly, a constant-voltage driven pressure sensor is available in which the temperature change in sensitivity of the strain gauge is canceled out by combination of transistors and resistors.

Figure 20:
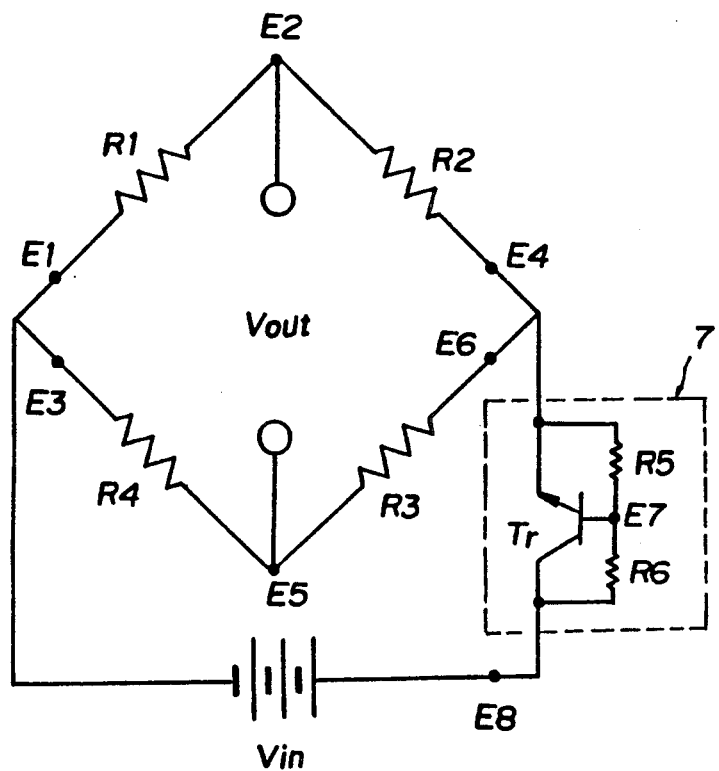
FIG. 20 is an equivalent circuit of the sixth embodiment.

FIG. 20 shows one example of such a pressure sensor; that is, FIG. 20 shows an equivalent circuit of the pressure sensor with a temperature compensating circuit 7. A transistor Tr and resistors R5 and R6 are connected between the electrode wiring pattern E8 and the connecting point of the electrode wiring patterns E4 and E6.

Figure 22:
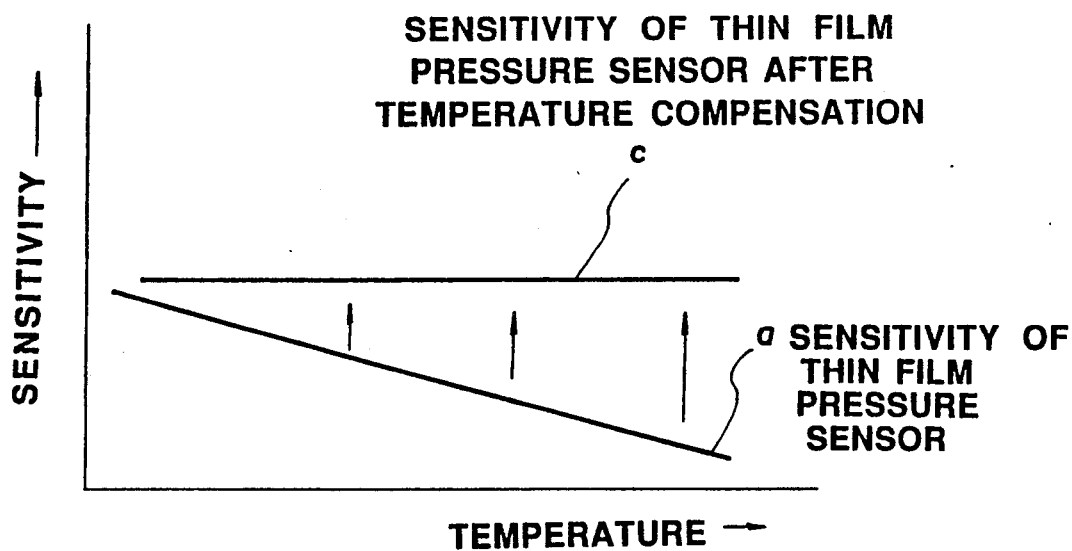
FIGS. 22 and 23 are graphical representations for a description of the operation of the semiconductor film pressure sensor shown in FIGS. 19(a) and (b).

The sensitivity of the film pressure sensor decreases straightly with increasing temperature as indicated by the straight line a in FIG. 22. The term "sensitivity" as used herein is intended to mean the ratio of the change in pressure applied to the pressure sensor and the change in resistance which is caused by the change in pressure; that is, "sensitivity"=$\Delta$(resistance)/$\Delta$(pressure).

Figure 23:
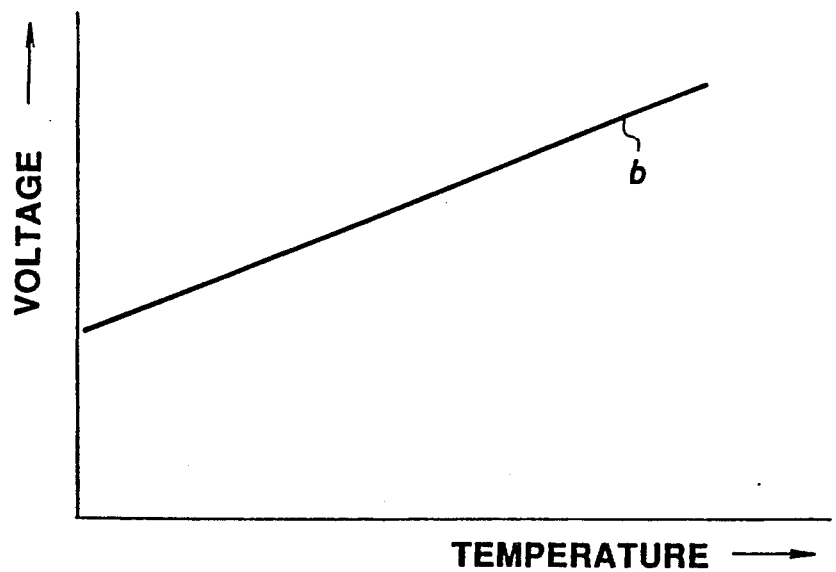

On the other hand, the voltage drop of the temperature compensating transistor increases with temperature; that is, as indicated by the straight line b in FIG. 23 the voltage applied to the sensor section is increased with temperature. As indicated by the straight line c in FIG. 22, the sensitivity is maintained constant even if temperature increases because the sensitivity increases with the voltage applied to the sensor section.

If the temperature compensating transistor and resistors are provided on the printed circuit board; i.e., outside of the sensor section, then the temperature of the sensor section becomes different from that of the temperature compensating elements, so that it is impossible to perform the temperature compensation accurately.

The rate of change in voltage drop of the transistor with temperature in the temperature compensating circuit is not always coincident with the rate of change in the decrement of sensitivity of the strain gauge with temperature. Therefore, the two resistors R5 and R6 are connected to the transistor, and the ratio of resistance of the resistors is adjusted so as to freely change the temperature dependability of the voltage drop, whereby the rate of change in voltage drop of the transistor is made coincided with the rate of change in the decrement of sensitivity of the sensor, for correction of the sensitivity.

If, in this case, the temperature compensating resistance elements are connected to the printed circuit board outside the film pressure sensor, then the method will suffer from the following difficulties: Since the film pressure sensor itself is small, connection of the transistor and resistor elements to the printed circuit board results in reduction of the yield because the number of components and the number of manufacturing steps are increased. In addition, the yield is reduced when the components are unsatisfactory in quality and they are insufficient in contact.

Figure 17A:
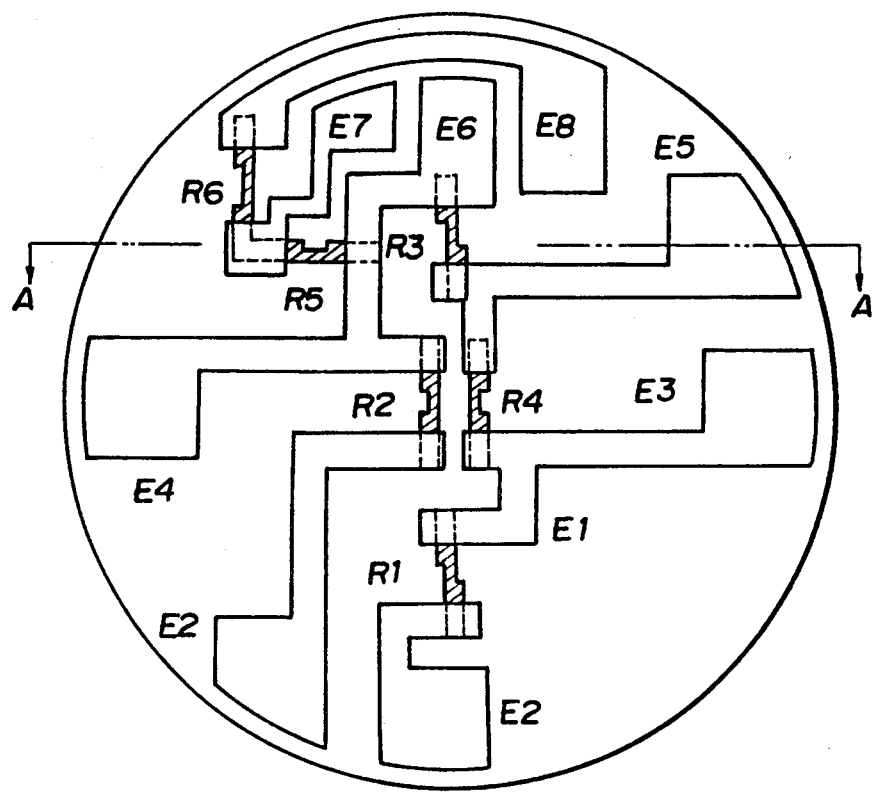
FIG. 17(a) is a plan view of a semiconductor film pressure sensor, a fifth embodiment of the invention.
Figure 17B:
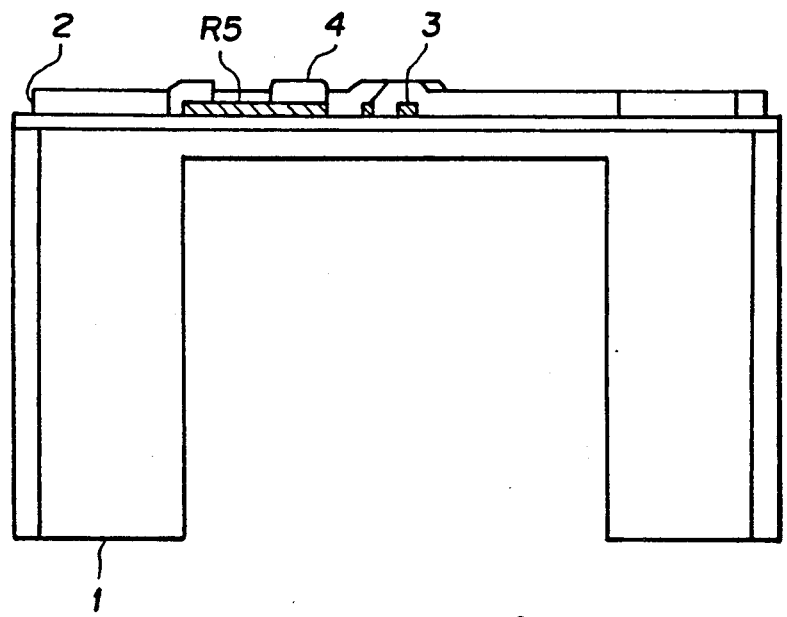
FIG. 17(b) is a sectional view taken along line A—A of FIG. 17(a).

In view of the foregoing, another embodiment is provided as shown in FIG. 17(a) and (b). As shown in FIG. 17(a) and (b), an insulating film 2 of silicon oxide film is formed on a diaphragm 1 of stainless, and pressure-sensitive resistor patterns R1 through R4 of polycrystalline silicon film 3 and resistors R5 and R6 are formed on the insulating film 2. Electrode wiring patterns 4 (E1 through E6) are formed thereon. A transistor Tr is connected between the patterns E4 and E5, and E7 and E8. The resistors R5 and R6 are so formed that they are positioned between the connecting point of the electrode wiring patterns E4 and E6 and an electric source (not shown) and on the surface of the diaphragm 1 where the pressure-sensitive resistance patters 3 (R1 through R4) are formed. The resistors R5 and R6 are used for temperature compensation.

FIG. 18(a) through (e) show steps of manufacturing the film pressure sensor shown in FIG. 17(a) and (b).

Figure 18A:
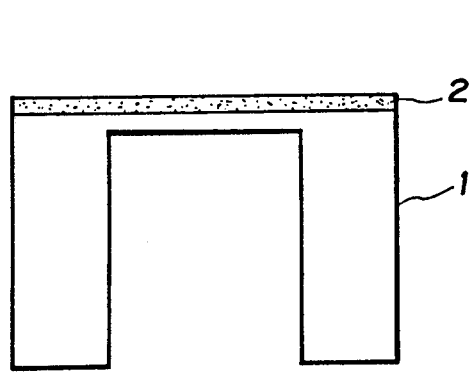
FIGS. 18(a)–(e) are diagrams showing steps of manufacturing the semiconductor film pressure sensor shown in FIGS. 17(a) and (b).

As shown in FIG. 18(a) an $SiO_2$ film is formed, as the insulating film 2, on the diaphragm of stainless steel to about 7 $\mu$m by the plasma CVD method.

Figure 18D:
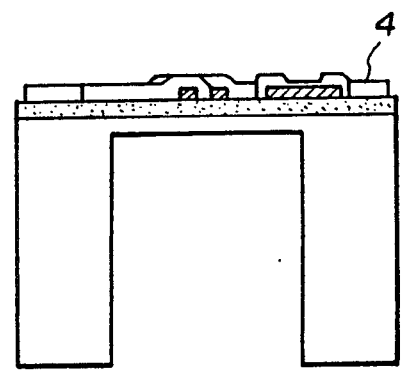
Figure 18B:
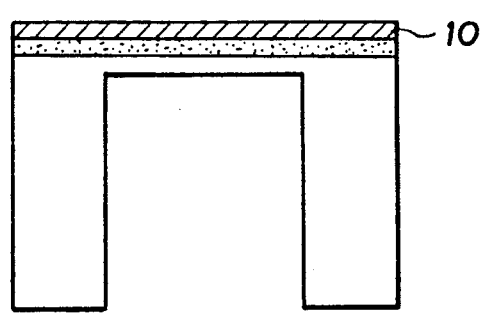

As shown in FIG. 18(b), a polycrystalline silicon film is formed on the $SiO_{32}$ film to about 0.5 $\mu$m using silane gas by the plasma CVD method.

Figure 18E:
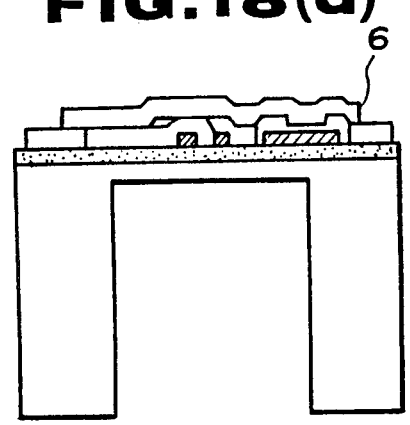
Figure 18C:
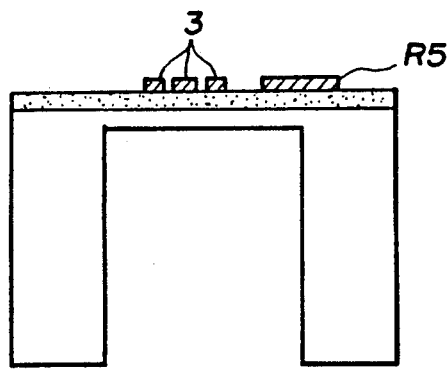

As shown in FIG. 18(c), the patterning of the polycrystalline silicon film is carried out by photolithography, to form the pressure-sensitive resistance patterns (R1 through R4) and resistance patterns (R5 and R6). In this case, by changing the configurations of the resistance patterns, the resistances thereof can be changed as desired; that is, the temperature dependability of the transistor in the compensating circuit can be changed as desired. If the resistance patterns (R5 and R6) are strained, then their resistances are changed. Therefore, the resistance patterns must be formed in the peripheral region of the diaphragm 1 so that they may not be strained by pressure; that is, their resistances may be maintained unchanged.

Thereafter, as shown in FIG. 18(d), an aluminum (Al) layer 4 is vacuum-deposited over the pressure-sensitive resistance patterns (R1 through R4) and the resistors (R5 and R6), and wiring patterns (E1 through E8) are formed by photolithography, and wiring is carried out.

As shown in FIG. 18(e) an SiNx film is formed, as a passivation film, to about 5000E by the plasma CVD method in order to protect the pressure-sensitive resistance patterns, resistors, and wiring patterns.

Figure 21:
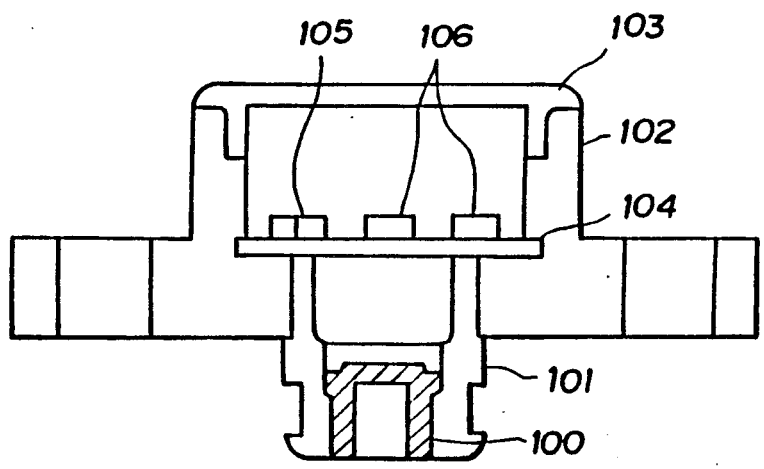
FIG. 21 is a diagram showing the semiconductor film pressure sensor built in a body.

Thus, the film pressure sensor has been manufactured. The film pressure sensor thus manufactured is built in a casing 101 as shown in FIG. 21, and the casing 101 is built in an external circuit casing 102. A printed circuit board 104 to which an amplifier 105 and the temperature compensating transistor are connected is provided inside the casing 102, which is closed with a lid 103. The transistor on the printed circuit board 104 is connected to the connecting point of the electrodes E4 and E6, and the electrodes E7 and E8 by wire bonding (not shown). Thus, the temperature compensating circuit has been completed. The output of the pressure sensor is amplified by the amplifier 105 and applied to external circuits.

With the film pressure sensor thus constructed, in forming the temperature compensating circuit the necessary resistance can be obtained without increasing the number of components or the number of manufacturing steps.

The embodiment has been described with reference to the circuit for compensating temperature with respect to sensitivity; however, the invention is not limited thereto or thereby. For instance, the technical concept of the invention is applicable to a circuit for compensating temperature with respect to zero point, or a circuit for compensating zero point because of the fluctuation in resistance of the pressure-sensitive resistance patterns.

Figure 19A:
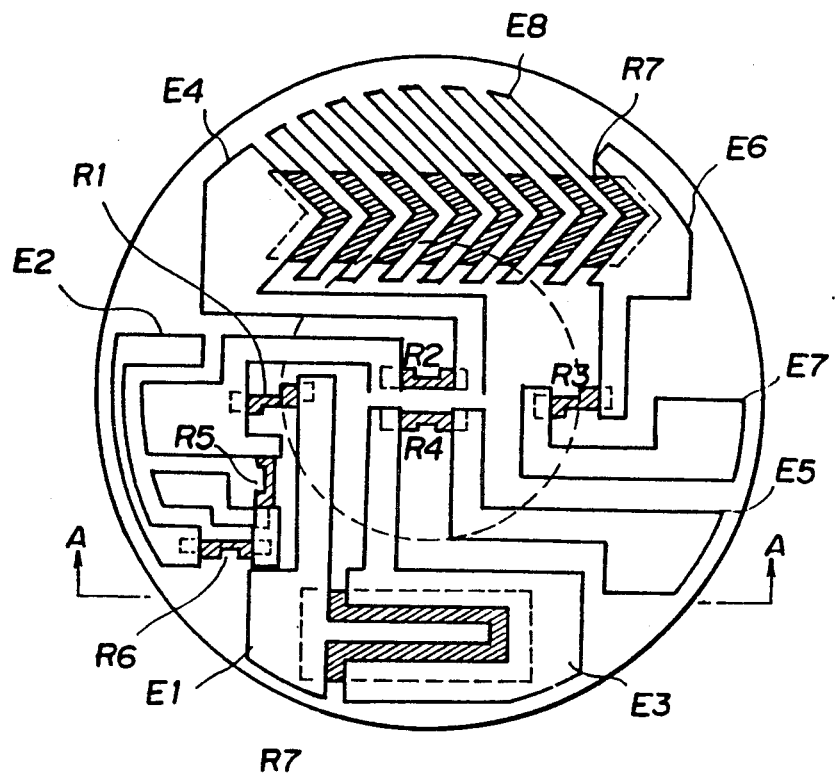
FIGS. 19(a) and (b) are plan and sectional views, respectively of a semiconductor film pressure sensor, a sixth embodiment of the invention.
Figure 19B:
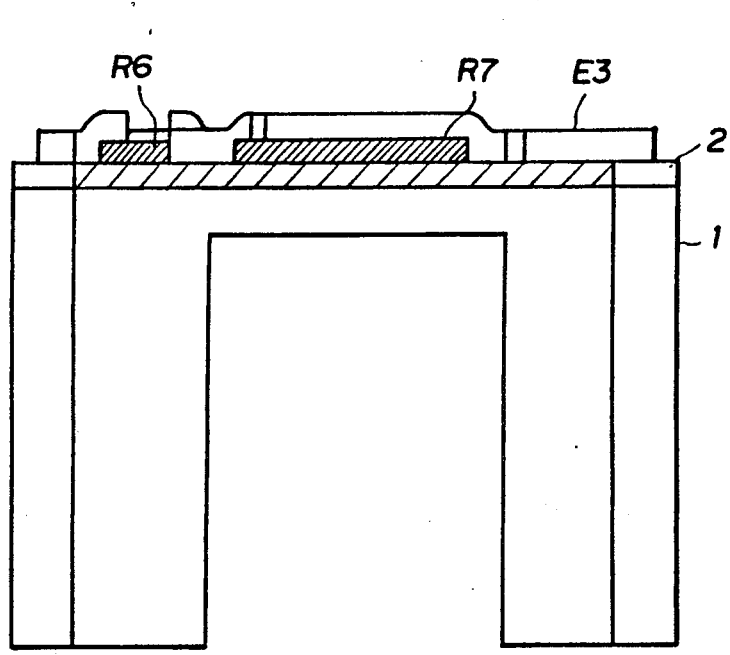

FIG. 19(a) and (b) are a plan view and a sectional view of another embodiment of the invention in which a resistor R7 for compensating temperature with respect to sensitivity and a resistor for compensating zero point because of the fluctuation in resistance of the pressure-sensitive resistance patterns are formed on the diaphragm of the film pressure sensor. First, an insulating layer (not shown) is formed on the diaphragm 11. Thereafter, a polycrystalline silicon layer is formed and subjected to patterning to provide pressure-sensitive resistance patterns (R1 through R4), resistors R5 and R6 for compensating temperature with respect to sensitivity, and the resistor R8 for compensating zero point because of the fluctuation in resistance of the pressure-sensitive resistance patterns. Under this condition, a metal layer such as an aluminum layer is formed and patterned to form electrode wiring patterns (E1 through E8), and then a passivation film (not shown) is formed.

As was described above, in the film pressure sensor, the compensating resistors are formed on the diaphragm using the same material as the pressure-sensitive resistance pattern. Therefore, the compensating resistors can be provided without increasing the number of components or the number of manufacturing steps such as soldering steps. Accordingly, difficulties such as for instance reduction of the yield due to insufficient contact or the like which may be caused during soldering is eliminated, and therefore the yield is improved. Furthermore, since the resistors are formed using the same material as the pressure-sensitive resistance patterns in one and the same manufacturing step; that is, the resistors can be provided without changing the number of steps of manufacturing the film pressure sensor. Therefore, the period of time required for manufacturing the film pressure sensor is not affected by the formation of the resistors at all.

Figure 24:
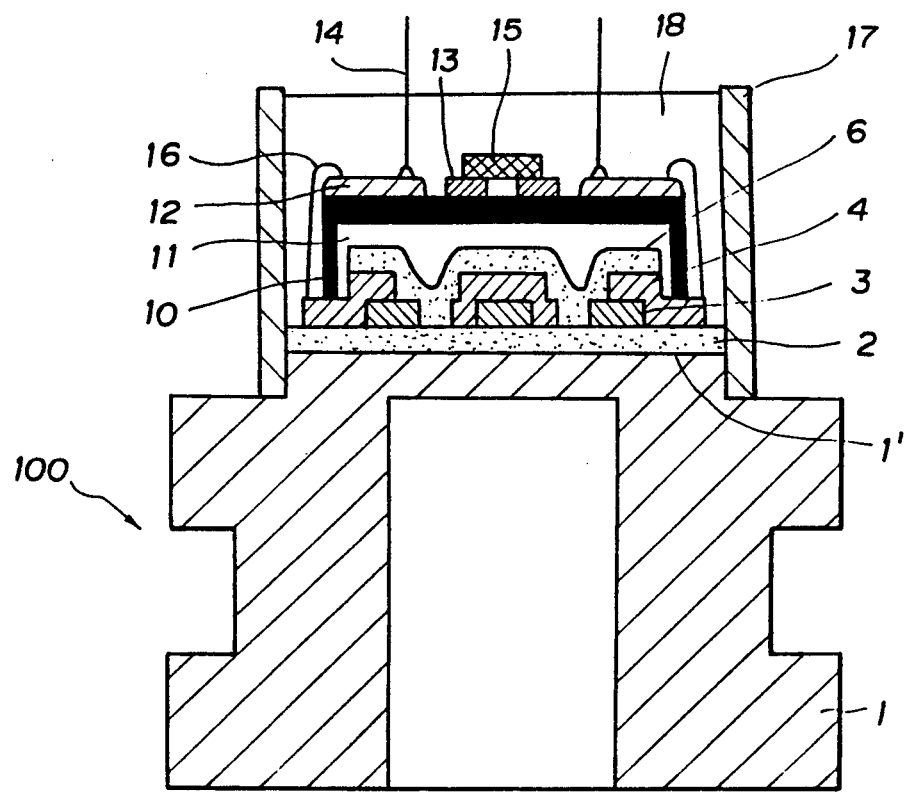
FIG. 24 is a sectional view showing a semiconductor film pressure sensor, a seventh embodiment of the invention.

In an actual pressure measurement, the pressure sensor, after sealingly contained in a resin case or metal case, is coupled to an object under measurement as shown in FIG. 24 for instance.

As shown in FIG. 24, a silicon oxide film is formed, as an insulating film 2, on a diaphragm 1 of stainless steel, and a polycrystalline silicon layer 3' is formed on the insulating film 1 by the plasma CVD method and patterned by photolithography to form strain gauge patterns 3. Thereafter, an aluminum film is vacuum-deposited and patterned by photolithography to form electrodes 4, and then a silicon nitride layer is formed as a passivation film 6 for protection of the sensor section 5. Thus, a film pressure sensor 100 has been manufactured. In order to isolate the film pressure sensor 100 from external air, a seal cap 10 is set in such a manner as to cover the strain gauge, and is then bonded to the stationary periphery 1' by using adhesive for instance.

Figure 25A:
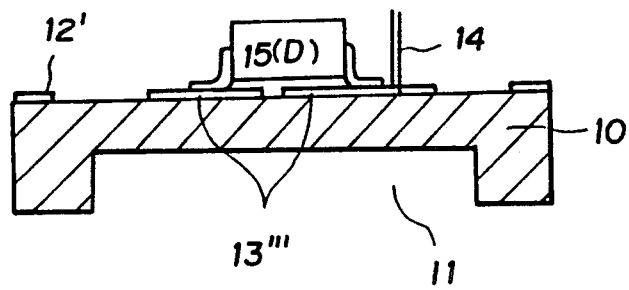
FIGS. 25(a) and (b) and FIGS. 26(a) and (b) are enlarged views showing essential components of the seventh embodiment.
Figure 25B:
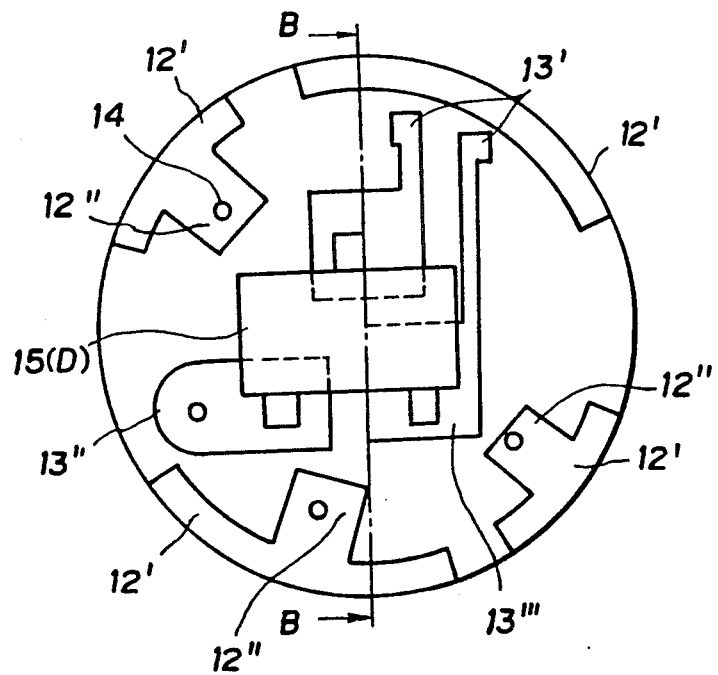
Figure 26A:
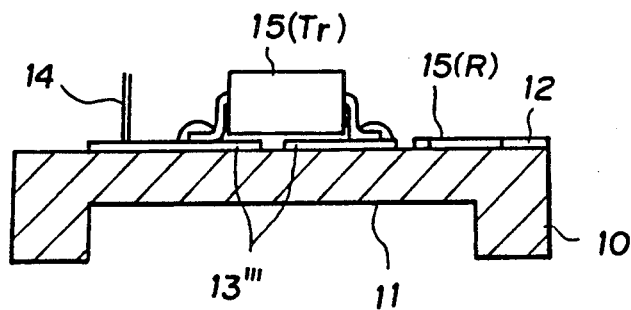

The seal cap 10 is shown in FIG. 25(a) in more detail. FIG. 25(a) is a sectional view taken along line B—B in FIG. 25(b). FIG. 25(b) is a plan view showing the seal cap 10 in the case where the temperature compensating elements is a diode. FIG. 26(a) is a sectional view taken along line B—B of FIG. 26(b), which is a plan view of the seal cap 10 in the case where the temperature compensating elements are a transistor and a resistor. A recess 11 is formed in the inner surface of the seal cap 10. Externally connecting wiring 12 and element connecting wiring 13 are formed on the outer surface, or upper surface, of the seal cap 10; that is, bonding pads 12' and 13', terminal pads 12" and 13" and an element pad 13''' are formed.

Terminals 14 are welded to the terminal pads 12' of the externally connecting wiring 12, and to the terminal pad 13" of the element connecting wiring 13, so as to be connected to external circuits.

Figure 26B:
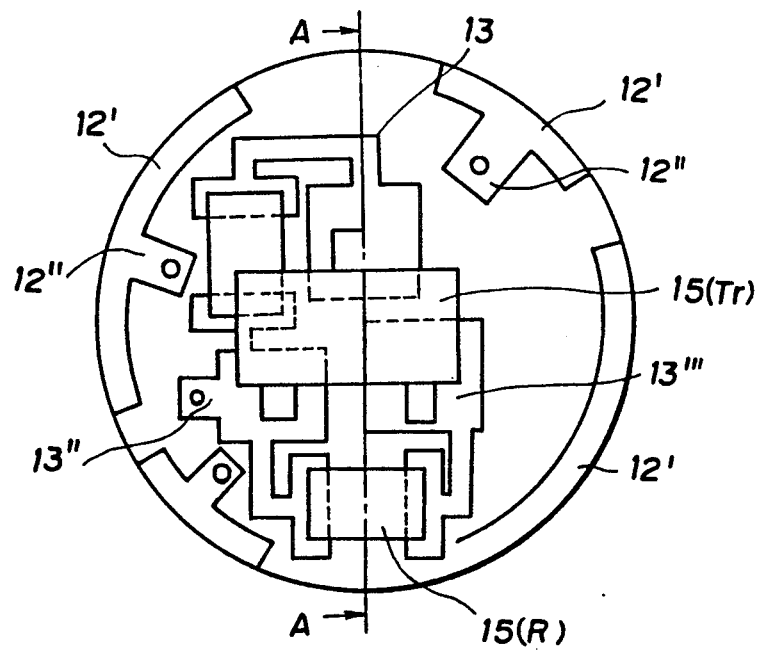

The temperature compensating element is connected to the element pad 13''' of the element connecting wiring 13. That is, as shown in FIG. 25(b), the diode 15 (D) is connected to the element pad; and as shown in FIG. 26(b), the transistor 15 (Tr) and the thick film resistor 15 (R) are connected thereto. The circuit diagram of the former film pressure sensor thus formed is equal to that shown in FIG. 20 in which the block 7 is replaced with the diode; and the circuit diagram of the latter film pressure sensor is equal to that shown in FIG. 20.

After the seal cap has been set, as shown in FIG. 24 the electrodes 4 of the film pressure sensor are connected to the bonding pads 12' and 13' of the wiring 12 and 13 on the seal cap 10 with the bonding wires 16. This connection can be readily achieved by supersonic bonding.

In the above-described seal cap 10, the terminal 14 and the element 15 have been connected thereto in advance. However, the terminal 14 and the element 15 may be connected to the seal cap 10 after connected with the bonding wires 16.

In the final step, a ring 17 is connected to the outer periphery of the diaphragm 1, and it is filled with potting compound 18. The sensor section 5 is more positively isolated from external air by the potting compound.

In the above-described film pressure sensor, the temperature compensating element can be positioned near the sensor section 5.

As was described above, in the embodiment, the temperature compensating element is provided on the seal cap; that is, it is located adjacent to the sensor section of the film pressure sensor. Accordingly, the sensor section and the temperature compensating element are substantially equal in temperature to each other, so that the temperature variation in temperature of the sensor section is completely canceled out by the voltage drop of the temperature compensating element, with the result that the film pressure sensor is markedly improved in reliability.

Figure 27:
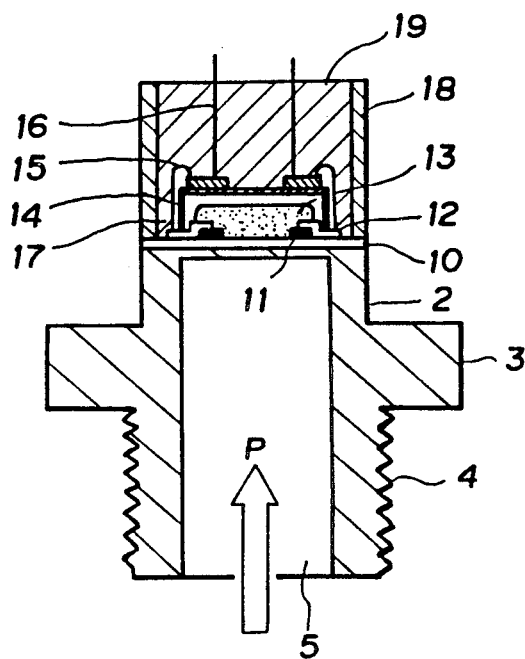
FIG. 27 is a sectional view of a semiconductor film pressure sensor, an eighth embodiment of the invention.

FIG. 27 shows another embodiment which can be coupled with an object under test with ease. In the embodiment, as shown in FIG. 27, a diaphragm part 2, a threaded head part 3, a threaded part, and a pressure introducing part 5 are made of stainless steel for instance as one unit.

FIG. 29(a) through (e) shows steps of manufacturing the embodiment shown in FIG. 27.

Figure 29A:
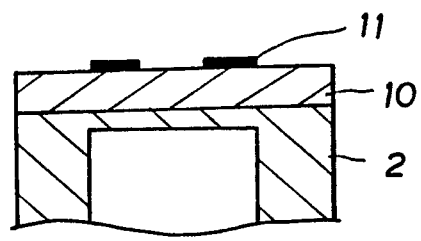
FIGS. 29(a) through (e) are diagrams showing steps of manufacturing the semiconductor film pressure sensor shown in FIG. 27.

As shown in FIG. 29(a), a silicon oxide film is formed, as an insulating film 10, on the upper surface of the diaphragm part 2, and a polycrystalline silicon film is formed on the insulating film 10 by the plasma CVD method, and patterned by photolithography, to form strain gauge patterns 11.

Figure 29B:
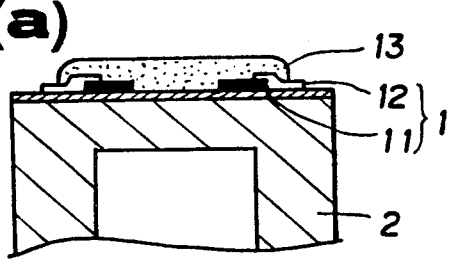

As shown in FIG. 29(b), an aluminum film is vacuum-deposited to form wiring patterns 12, and then a silicon nitride film is formed, as a passivation layer 13, by the plasma CVD method in such a manner as to cover the sensor section 1.

Figure 29C:
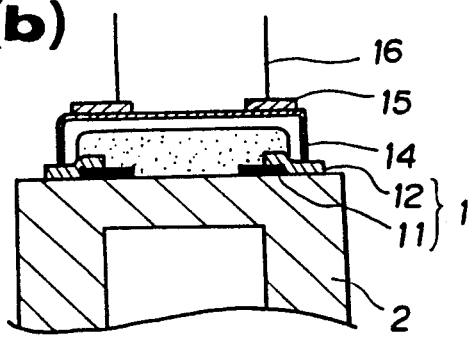

As shown in FIG. 29(c), a seal cap 14 is bonded with adhesive for instance in such a manner as to cover the passivation layer 13. Wiring pads 15 and externally connecting terminals 16 have been formed on the seal cap 14 in advance.

Figure 29D:
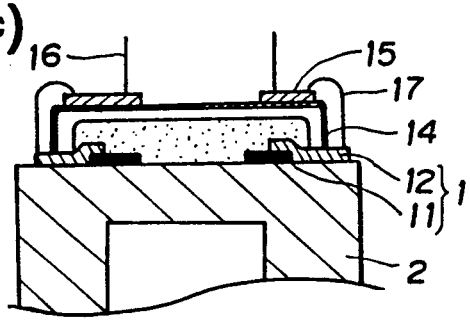

As shown in FIG. 29(d), the wiring patterns 12 and the wiring pads 15 are connected using bonding wires 17.

Figure 29E:
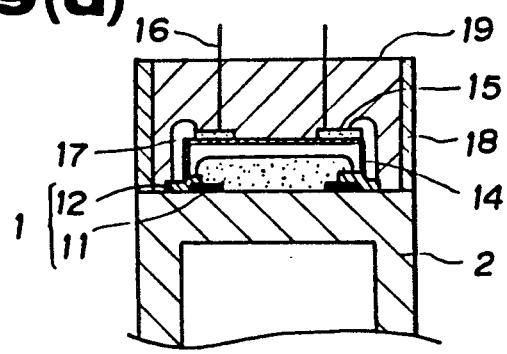

Thereafter, as shown in FIG. 29(e) the ring 18 is bonded to the outer periphery of the diaphragm part 2 with adhesive for instance, and then it is filled with potting compound so that the sensor section 1 is isolated from external air.

The strain gauge of the pressure sensor thus manufactured is connected to an external circuit (not shown) through the wiring patterns 12, the bonding wires 7, the wiring pads 15 and the external connecting terminals 16.

Figure 28:
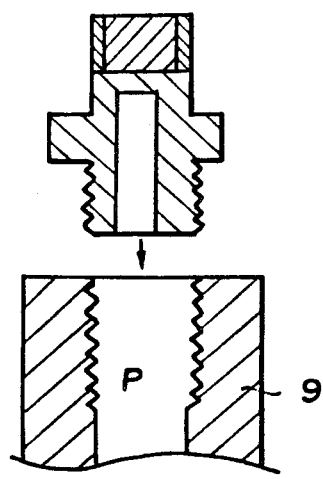
FIG. 28 is a diagram for a description of the connection of the eighth embodiment.

The pressure sensor, as shown in FIG. 28, can be detachably coupled to an object 9 under measurment with ease which is threaded. Thus, it has a wide range of application as steel or plant process control means, or industrial machine control means, and FA means.

In the above-described pressure sensor, the diaphragm part 2 may be welded to the threaded head part 4.

Thus, the above-described embodiment has the following merits:

(a) The durability and accuracy are improved because the sensor section 1, the diaphragm part 2, the threaded head part 3, the threaded part 4, and the pressure introducing part 5 are formed as one unit without use of adhesive.

(b) Because of the above-described construction, the pressure sensor can be detachably engaged with an object under test with ease which is threaded suitably.

(c) Since the sensor section 1 is in the form of a film, the pressure sensor of the invention is extremely small in size.

(d) The strain gauge is made of a semiconductor film such as a polycrystalline silicon film, and therefore it is excellent in gauge efficiency and in accuracy. Accordingly, it requires no expensive external circuit, thus being economical. And the strain gauge itself is small in size.

Thus, the pressure sensor according to the invention is high in durability, small in size, excellent in accuracy, and low in manufacturing cost, and it can be detachably engaged with an object under measurement with ease.

INDUSTRIAL APPLICABILITY

In the semiconductor film pressure sensor according to the invention, the pressure-sensitive resistance layers are formed using an n-type polycrystalline layer, and therefore the offset voltage is low, and the temperature characteristic is excellent. Furthermore, since the coarsely adjusting patterns and the finely adjusting patterns for zero point adjustment, and the resistor for temperature compensation are formed using the same material as the pressure-sensitive resistance layers in one and the same manufacturing step, the semiconductor film pressure sensor high in accuracy can be produced with ease.

We claim:

1. A semiconductor film pressure sensor which comprises:
    a diaphragm to one surface of which a pressure to be measured is applied;
    pressure-sensitive resistance layer patterns formed of an n-type polycrystalline silicon layer on the other surface of said diaphragm;
    electrode wiring patterns connected to said pressure-sensitive resistance layer patterns;
    signal detecting means for detecting through said electrode wiring patterns signals corresponding to the resistance of said pressure-sensitive resistance layer patterns which change with said pressure to be measured;
    said diaphragm being in the form of a cylinder having a thin circular portion, said pressure to be measured being applied to said thin circular portion of said cylinder from inside;
    said pressure-sensitive resistance layer patterns being formed on the outside of said circular thin portion; and
    said surface of said diaphragm on which said pressure-sensitive resistance layer patterns are formed being made of an electrically conductive material and covered with an insulating layer.

2. A semiconductor film pressure sensor as claimed in claim 1, in which said pressure-sensitive resistance layer patterns includes first and second pressure-sensitive resistance layer pattern formed in the central portion of said diaphragm, and third and fourth pressure-sensitive resistance layer patterns formed in the peripheral portion of said diaphragm, said first through fourth pressure-sensitive resistance layer patterns forming a bridge circuit with said electrode wiring patterns.

3. A semiconductor film pressure sensor as claimed in claim 2, in which said electrode wiring patterns are: a first electrode wiring pattern connected to one end of said first pressure-sensitive resistance layer pattern; a second electrode wiring pattern connected to the other end of said first pressure-sensitive resistance layer pattern and one end of said second pressure-sensitive resistance layer pattern; a third electrode wiring pattern connected to one end of said third pressure-sensitive resistance layer pattern; a fourth electrode wiring pattern connected to the other end of said second pressure-sensitive resistance layer pattern; a fifth pressure-sensitive resistance layer patter connected to the other end of said third electrode wiring pattern and one end of said fourth pressure-sensitive resistance layer pattern; and a sixth electrode wiring pattern connected to the other end of said fourth pressure-sensitive resistance layer pattern, and said signal detecting means detects said output signals through said second and fifth electrode wiring patterns with an electric source connected between the connecting point of said first and third electrode wiring patterns and the connecting point of said fourth and sixth wiring patterns.

4. A semiconductor film pressure sensor as claimed in claim 3, which further comprises:

a zero point coarsely adjusting pattern which includes a plurality of adjusting electrode patterns arranged at predetermined intervals, and a plurality of coarsely adjusting resistance patterns formed between said adjusting electrode patterns, and are arranged between said fourth and sixth electrode wiring patterns; and a zero point finely adjusting pattern which includes at least one finely adjusting resistance pattern and is connected between said first and third electrode wiring patterns.

5. A semiconductor film pressure sensor as claimed in claim 1, in which a first pressure-sensitive resistance layer pattern and a second pressure-sensitive resistance layer pattern, and a third pressure-sensitive resistance layer pattern and a fourth pressure-sensitive resistance layer are arranged symmetrical with respect to the center of said diaphragm.

6. A semiconductor film pressure sensor as claimed in claim 1, which further comprises: adjusting patterns formed on the same surface as said pressure-sensitive resistance layer patterns, for adjusting the resistances of said pressure-sensitive resistance layer patterns.

7. A semiconductor film pressure sensor as claimed in claim 6, in which said adjusting pattern include: a plurality of adjusting electrode patterns arranged at predetermined intervals; and a plurality of adjusting resistance patterns formed between said plurality of adjusting electrode patterns.

8. A semiconductor film pressure sensor as claimed in claim 7, in which said adjusting resistance patterns are straight.

9. A semiconductor film pressure sensor as claimed in claim 7, in which said adjusting resistance patterns are L-shaped or U-shaped.

10. A semiconductor film pressure sensor as claimed in claim 7, in which said adjusting resistance patterns are arranged coaxial with respect to the center of said diaphragm.

11. A semiconductor film pressure sensor as claimed in claim 7, in which said adjusting resistance patterns are made of an n-type polycrystalline silicon film layer which is equal to the material of said pressure-sensitive resistance layer patterns.

12. A semiconductor film pressure sensor as claimed in claim 7, in which said adjusting electrode patterns are made of the same material as said electrode wiring patterns.

13. A semiconductor film pressure sensor as claimed in claim 1, which further comprises: a temperature compensating circuit including a transistor, and a resistance circuit for determining a bias voltage for said transistor, for compensating a temperature characteristic.

14. A semiconductor film pressure sensor as claimed in claim 13, in which said resistance circuit include two resistance patterns which are formed on the same surface as said pressure-sensitive resistance layer patterns.

15. A semiconductor film pressure sensor as claimed in claim 14, in which said resistance patterns are made of the same material as said pressure-sensitive resistance layer patterns.

16. A semiconductor film pressure sensor as claimed in claim 1, which further comprises: a seal cap arranged in such a manner as to contain said pressure-sensitive resistance layer patterns, and part of said electrode wiring patterns; and a temperature compensating element provided on said seal cap.

* * * * *